US009979450B2

(12) United States Patent
Jiang et al.

(10) Patent No.: US 9,979,450 B2
(45) Date of Patent: May 22, 2018

(54) ADAPTIVE CODEWORD AND CODEBLOCK SELECTION IN WIRELESS COMMUNICATIONS

(71) Applicant: QUALCOMM Incorporated, San Diego, CA (US)

(72) Inventors: Jing Jiang, San Diego, CA (US);
Wanshi Chen, San Diego, CA (US);
John Smee, San Diego, CA (US); Peter Gaal, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/726,188

(22) Filed: Oct. 5, 2017

(65) Prior Publication Data
US 2018/0102877 A1    Apr. 12, 2018

Related U.S. Application Data

(60) Provisional application No. 62/405,820, filed on Oct. 7, 2016.

(51) Int. Cl.
*H04B 7/04*      (2017.01)
*H04W 28/18*    (2009.01)
(Continued)

(52) U.S. Cl.
CPC ........... *H04B 7/0456* (2013.01); *H04B 7/024* (2013.01); *H04B 7/0473* (2013.01);
(Continued)

(58) Field of Classification Search
CPC .... H04B 7/0456; H04B 7/0639; H04B 7/024; H04B 7/0413; H04B 7/0452;
(Continued)

(56) References Cited

U.S. PATENT DOCUMENTS 8,320,275 B2 * 11/2012 Zhang ................. H04B 7/0417
370/230
2011/0103503 A1 * 5/2011 Shin ..................... H04B 7/024
375/267
(Continued)

FOREIGN PATENT DOCUMENTS

WO    WO-2013147672 A1    10/2013

OTHER PUBLICATIONS

Intel Corporation, "Comparison between Single and Multiple Codewords for Precoded MIMO," 3GPP TSG RAN WG1 Meeting #45, R1-061127, Shanghai, China, May 8-12, 2006, 7 pgs., XP008137180, 3rd Generation Partnership Project.

(Continued)

*Primary Examiner* — Ashley Shivers
(74) *Attorney, Agent, or Firm* — Holland & Hart, LLP

(57) ABSTRACT

A transmitter may initiate multiple-input multiple-output (MIMO) communications with a receiver in which a number of codewords used in MIMO transmissions may be selected to provide enhanced communications for a particular service that is associated with the MIMO transmission. In cases where a lower-latency service is identified, a MIMO transmission may be configured with one codeword transmitted over multiple spatial layers, which may provide lower processing latency at a receiver relative to processing of multiple codewords. In cases where a mobile broadband service is identified, a MIMO transmission configured with two (or more) codewords may be transmitted over multiple spatial layers, which may provide increased data throughput relative to a single codeword MIMO transmission. A codeblock size for a transmission also may be selected based at least in part on a service associated with the transmission.

30 Claims, 21 Drawing Sheets

(51) Int. Cl.
*H04W 72/12* (2009.01)
*H04B 7/02* (2018.01)
*H04B 7/0456* (2017.01)
*H04L 1/18* (2006.01)
*H04L 1/00* (2006.01)
*H04B 7/024* (2017.01)
*H04L 1/16* (2006.01)
*H04L 5/00* (2006.01)

(52) U.S. Cl.
CPC .......... *H04L 1/0003* (2013.01); *H04L 1/1812* (2013.01); *H04W 28/18* (2013.01); *H04W 72/12* (2013.01); *H04L 1/1671* (2013.01); *H04L 5/0023* (2013.01); *H04L 5/0053* (2013.01)

(58) Field of Classification Search
CPC ................ H04B 7/0495; H04B 7/0473; H04L 25/03898; H04L 25/03904; H04L 25/03942; H04L 25/03949; H04W 28/18; H04W 72/12; H04W 72/1205; H04W 74/04
See application file for complete search history.

(56) References Cited

U.S. PATENT DOCUMENTS

| | | | | |
|---|---|---|---|---|
| 2011/0244847 | A1* | 10/2011 | Mallik | H04B 7/024 455/422.1 |
| 2013/0114427 | A1* | 5/2013 | Maattanen | H04B 7/024 370/252 |
| 2013/0121439 | A1* | 5/2013 | Zhu | H04B 7/024 375/296 |
| 2014/0113669 | A1* | 4/2014 | Kuo | H04W 16/28 455/501 |

OTHER PUBLICATIONS

ISA/EP, International Search Report and Written Opinion of the International Searching Authority, Int'l Application No. PCT/US2017/055641, dated Jan. 22, 2018, European Patent Office, Rijswijk, NL, 15 pgs.
NTT DOCOMO et al., "Investigation on Optimum Number of Codewords for MIMO Multiplexing in E-UTRA Downlink," 3GPP TSG RAN WG1 Meeting #46, R1-062106, Tallinn, Estonia, Aug. 28-Sep. 1, 2006, 7 pgs., XP050102651, 3rd Generation Partnership Project.

* cited by examiner

ADAPTIVE CODEWORD AND CODEBLOCK SELECTION IN WIRELESS COMMUNICATIONS

CROSS REFERENCES

The present application for patent claims priority to U.S. Provisional Patent Application No. 62/405,820 by Jiang, et al., entitled "Adaptive Codeword and Codeblock Selection In Wireless Communications," filed Oct. 7, 2016, assigned to the assignee hereof.

BACKGROUND

The following relates generally to wireless communication, and more specifically to adaptive codeword and codeblock (e.g., codeblock size) selection in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB). A base station may communicate with a set of UEs on downlink (DL) channels (e.g., for transmissions from a base station to a UE) and uplink (UL) channels (e.g., for transmissions from a UE to a base station).

As communications providers continue to increase the capacity of wireless networks, and as demand for such capacity grows, efficient use of wireless resources becomes increasingly important for high quality and relatively low cost wireless communications. One technique used to increase capacity of wireless networks is multiple-input, multiple-output (MIMO) communications, in which one of various MIMO transmission modes may be selected to provide efficient use of available wireless resources. Some of the MIMO transmission modes provide that multiple separate data streams may be transmitted using separate spatial layers, which may increase throughput relative to transmission of a single data stream. A receiver, such as a UE or a base station, that receives MIMO transmissions may process the received MIMO signals and decode the separate data streams. The complexity of the processing of received MIMO signals may depend on one or more characteristics associated with the MIMO transmission, such as a number of codewords that are transmitted, a codeblock size of the transmissions, a number of feedback processes (e.g., a number of hybrid automatic repeat request (HARQ) processes) configured for the MIMO transmission, and the like. In some cases it may be desirable to increase wireless network efficiency by increasing data throughput, reducing latency associated with decoding received signals, and/or providing feedback of successful or unsuccessful reception of the received signals.

SUMMARY

A base station may initiate multiple-input multiple-output (MIMO) communications with a user equipment (UE) in which a number of codewords used in MIMO transmissions may be selected to provide enhanced communications for a particular service that is associated with the MIMO transmission. In some examples, a lower-latency service may be identified, and a MIMO transmission may be configured with one codeword transmitted over one or more spatial layers, which may provide lower processing latency at a receiver (e.g., relative to processing of multiple codewords). In other examples, a mobile broadband service may be identified, and a MIMO transmission configured with two (or more) codewords transmitted over multiple spatial layers, which may provide increased data throughput relative to a single codeword MIMO transmission. In some examples, a codeblock size for a MIMO transmission may be selected based at least in part on a service associated with the MIMO transmission.

A method of wireless communication is described. The method may include identifying, for a carrier supporting a plurality of service types, resources for a first MIMO transmission, identifying a first service type associated with the first MIMO transmission, selecting a first number of codewords to be transmitted in the first MIMO transmission based at least in part on the first service type, formatting information to be transmitted into one or more codewords corresponding to the selected first number of codewords, and transmitting the one or more codewords in the first MIMO transmission.

An apparatus for wireless communication is described. The apparatus may include means for identifying, for a carrier supporting a plurality of service types, resources for a first MIMO transmission, means for identifying a first service type associated with the first MIMO transmission, means for selecting a first number of codewords to be transmitted in the first MIMO transmission based at least in part on the first service type, means for formatting information to be transmitted into one or more codewords corresponding to the selected first number of codewords, and means for transmitting the one or more codewords in the first MIMO transmission.

Another apparatus for wireless communication is described. The apparatus may include a processor, memory in electronic communication with the processor, and instructions stored in the memory. The instructions may be operable to cause the processor to identify, for a carrier supporting a plurality of service types, resources for a first MIMO transmission, identify a first service type associated with the first MIMO transmission, select a first number of codewords to be transmitted in the first MIMO transmission based at least in part on the first service type, format information to be transmitted into one or more codewords corresponding to the selected first number of codewords, and transmit the one or more codewords in the first MIMO transmission.

A non-transitory computer readable medium for wireless communication is described. The non-transitory computer-readable medium may include instructions operable to cause a processor to identify, for a carrier supporting a plurality of service types, resources for a first MIMO transmission, identify a first service type associated with the first MIMO transmission, select a first number of codewords to be transmitted in the first MIMO transmission based at least in part on the first service type, format information to be transmitted into one or more codewords corresponding to the selected first number of codewords, and transmit the one or more codewords in the first MIMO transmission.

A method of wireless communication is described. The method may include identifying, for a carrier supporting a plurality of service types, resources for a first MIMO transmission, identifying a first service type associated with the first MIMO transmission, selecting a first codeblock (CB) size for one or more CBs to be transmitted in one or more codewords of the first MIMO transmission based at least in part on the first service type, formatting information to be transmitted into the one or more CBs, and transmitting the one or more CBs in the first MIMO transmission.

An apparatus for wireless communication is described. The apparatus may include means for identifying, for a carrier supporting a plurality of service types, resources for a first MIMO transmission, means for identifying a first service type associated with the first MIMO transmission, means for selecting a first CB size for one or more CBs to be transmitted in one or more codewords of the first MIMO transmission based at least in part on the first service type, means for formatting information to be transmitted into the one or more CBs, and means for transmitting the one or more CBs in the first MIMO transmission.

Another apparatus for wireless communication is described. The apparatus may include a processor, memory in electronic communication with the processor, and instructions stored in the memory. The instructions may be operable to cause the processor to identify, for a carrier supporting a plurality of service types, resources for a first MIMO transmission, identify a first service type associated with the first MIMO transmission, select a first CB size for one or more CBs to be transmitted in one or more codewords of the first MIMO transmission based at least in part on the first service type, format information to be transmitted into the one or more CBs, and transmit the one or more CBs in the first MIMO transmission.

A non-transitory computer readable medium for wireless communication is described. The non-transitory computer-readable medium may include instructions operable to cause a processor to identify, for a carrier supporting a plurality of service types, resources for a first MIMO transmission, identify a first service type associated with the first MIMO transmission, select a first CB size for one or more CBs to be transmitted in one or more codewords of the first MIMO transmission based at least in part on the first service type, format information to be transmitted into the one or more CBs, and transmit the one or more CBs in the first MIMO transmission.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
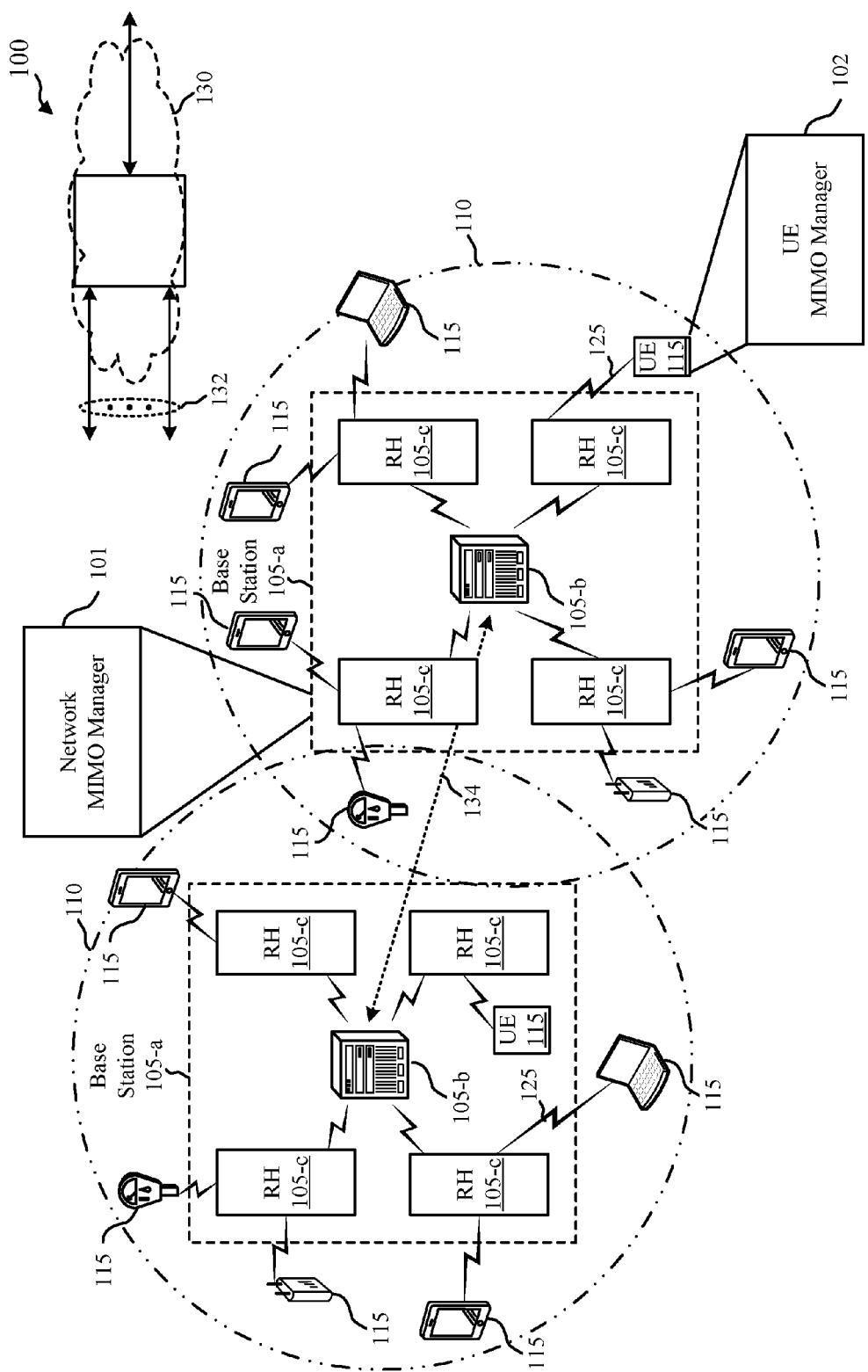
FIG. 1 shows a block diagram of a wireless communication system, in accordance with various aspects of the present disclosure.

Techniques are described that provide for codeword or codeblock (CB) size selection for uplink and/or downlink multiple-input multiple-output (MIMO) wireless transmissions based on one or more factors associated with a service being provided by the MIMO transmission, a receiver that is to receive the MIMO transmission, one or more scheduling conditions, or combinations of these factors. In some examples, a number of codewords transmitted in a MIMO transmission may be selected based on a service type associated with the transmission to provide enhanced communications for a particular service. In some examples, a lower-latency service (e.g., an ultra-reliable low-latency communication (URLLC) service) may be identified, and a MIMO transmission configured with one codeword transmitted over one or more spatial layers may be selected to provide lower processing latency at a receiver relative to processing of multiple codewords. In other examples, a mobile broadband service (e.g., an enhanced mobile broadband (eMBB) service) may be identified, and a MIMO transmission configured with two (or more) codewords transmitted over multiple spatial layers may be selected to provide increased data throughput relative to a single codeword MIMO transmission.

In some examples, a processing capability of a user equipment (UE) that is to receive a MIMO transmission is used as a factor in determining a number of codewords to configure in the MIMO transmission, alone or in combination with one or more other factors as discussed herein. In such examples, a UE with a higher processing capability may receive two or more codewords in a MIMO transmission, and a UE with a relatively lower processing capability may receive a single codeword in a MIMO transmission. Additionally or alternatively, one or more scheduling conditions associated with a UE, such as an amount of data to be transmitted or a channel quality, for example, may be used to determine a number of codewords to be used in the MIMO transmission.

In further examples, alone or in conjunction with codeword selection as discussed herein, a CB size for a MIMO transmission may be selected based at least in part on a service associated with the MIMO transmission. In some examples, a lower CB size may be selected for a low latency service, and a higher CB size may be selected for a service provided higher data rates (e.g., eMBB, etc.). In certain examples a maximum CB size may be dynamically or semi-statically configured based on a likelihood that a MIMO transmission of a first service (e.g., an eMBB service) will be punctured by a MIMO transmission of a second service (e.g., a URLLC service). In such examples, a lower maximum CB size may be selected to provide higher likelihood of successful decoding of the first service MIMO transmission. In some examples, transmissions associated with the first service and second service may be scrambled using a different scrambling sequence, which a receiver may use to help differentiate transmissions from the different services.

In still further examples, hybrid automatic repeat request (HARQ) processes may be configured based on a number of codewords in a MIMO transmission. For example, a single HARQ process or a first HARQ response timing may be associated with MIMO transmissions having one codeword, while two HARQ processes or a more relaxed second HARQ response timing may be associated with MIMO transmissions having two codewords. In certain examples, the number of codewords for a MIMO transmission may be selected based at least in part on whether the MIMO transmission is to be received at a base station in an uplink (UL) MIMO transmissions, or at a UE in a downlink (DL) MIMO transmission. In such examples, the DL MIMO transmission may use fewer codewords than the UL MIMO transmission. Such a selection of codewords may be based on other factors, as discussed herein, as well, such as UE processing capability for example. In certain examples, portions of a MIMO transmission may be transmitted by different transmission points (TPs) using, for example, non-coherent coordinated multi-point (CoMP) transmission techniques. In such examples, the number of codewords in the MIMO transmission may be selected based on the number of different TPs, with MIMO transmissions from two TPs having two codewords, and MIMO transmissions from a single TP having a number of codewords selected based on one or more other factors. Additionally, some examples may provide that two or more modulation orders or two or more modulation and coding schemes (MCSs) may be used for two or more transmission layers of a MIMO transmission.

As indicated above, in some cases a receiver of a MIMO transmission may provide feedback (e.g., HARQ feedback) to the MIMO transmitter to indicate successful or unsuccessful receipt of all or a portion of the MIMO transmission. In some cases, for example, a single codeword may be mapped to two or more transmission layers, and the receiver may determine that reliable reception is supported on fewer layers. The receiver may then provide a negative acknowledgment (NACK) of the MIMO transmission, and may also indicate a number of layers supported. A retransmission of the MIMO transmission may be performed using fewer layers than the initial MIMO transmission (e.g., a single codeword mapped to one or two layers).

The present disclosure describes various techniques with reference to next generation networks (e.g., 5G or NR networks) that are being designed to support features such as high bandwidth operations, more dynamic subframe types, and self-contained subframe types (in which HARQ feedback for a subframe may be transmitted before the end of the subframe). However, such techniques may be used for any system in which MIMO transmissions may be used for UL or DL communications.

Aspects of the disclosure are initially described in the context of a wireless communications system. Aspects of the disclosure are further illustrated by and described with reference to diagrams, system diagrams, and flowcharts that relate to adaptive codeword and CB selection in MIMO wireless communications.

FIG. 1 illustrates an example of a wireless communication system 100, in accordance with various aspects of the disclosure. The wireless communication system 100 may include network devices 105, UEs 115, and a core network 130. Wireless communication system 100 may support waveform selection for UL or DL transmissions. For example, wireless communication system 100 may support adaptive codeword and codeblock selection in MIMO transmissions based on different service types associated with the MIMO transmissions, scheduling conditions associated with the MIMO transmissions, capabilities of a receiver that is to receive the MIMO transmissions, or any combination thereof.

A core network 130 may provide user authentication, access authorization, tracking, Internet Protocol (IP) connectivity, and other access, routing, or mobility functions. At least some of the network devices 105 (e.g., network device 105-*a* and network device 105-*b*, which may be an example of an access node controller (ANC) or a centralized unit) may interface with the core network 130 through backhaul links 132 (e.g., S1, S2, NG-1, NG-2, NG-3, NG-C, NG-U etc.) and may perform radio configuration and scheduling for communication with the UEs 115 within an associated coverage area 110. In various examples, the network devices 105-*b* may communicate, either directly or indirectly (e.g., through core network 130), with each other over backhaul links 134 (e.g., X1, X2, Xn etc.), which may be wired or wireless communication links. In some examples network device 105-*a* may alternatively be referred to as base station 105-*a*, which for Long Term Evolution (LTE) or LTE-Advanced (LTE-A) networks may be known as an evolved NodeB (eNB) and for NR networks may be known as a next generation nodeB (gNB), an NR Node-B, or an NR access node.

Each network device 105-*b* may also communicate with a number of UEs 115 through a number of other network devices 105-*c*, where network device 105-*c* may be an example of a transmission reception point (TRP), a distributed unit (DU), a radio head (RH), a remote radio head (RRH), or a smart radio head. In alternative configurations, various functions of each network device 105 may be distributed across various network devices 105 (e.g., radio heads/distributed units and access network controllers/centralized units) or consolidated into a single network device 105 (e.g., a base station/an access node).

The wireless communication system 100 may support synchronous or asynchronous operation. For synchronous operation, the network devices 105-*a* and/or network devices 105-*c* may have similar frame timing, and transmissions from different network devices 105-*a* and/or network devices 105-*c* may be approximately aligned in time. For asynchronous operation, the network devices 105-*a* and/or network devices 105-*c* may have different frame timings, and transmissions from different network devices 105-*a* and/or network devices 105-*c* may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or one of the layer 2 protocol stack (e.g., Packet Data Convergence Protocol (PDCP)) may be IP-based. One of the layer 2 protocol stack (e.g., PDCP, Radio Link Control (RLC) or Medium Access Control (MAC)) may in some cases perform packet segmentation and reassembly to communicate over logical channels. One of the layer 2 protocol stack (e.g., MAC) may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a network device 105-*c*, network device 105-*b*, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, a smart phone, a smart watch, a customer premises equipment (CPE) or the like. A UE 115 may be able to communicate with various types of network devices 105-*a*, network devices 105-*c*, base stations, access points, or other network devices, including macro eNBs, small cell eNBs, relay base stations, and the like. A UE 115 may also be able to communicate directly with other UEs 115 (e.g., using a peer-to-peer (P2P) protocol).

The communication links 125 shown in wireless communication system 100 may include UL channels from a UE 115 to a network device 105, and/or DL channels, from a network device 105 to a UE 115. The downlink channels may also be called forward link channels, while the uplink channels may also be called reverse link channels. Control information and data may be multiplexed on an uplink channel or downlink according to various techniques. Control information and data may be multiplexed on a downlink channel, for example, using TDM techniques, FDM techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

Communication in wireless communication system 100 may be performed via carriers. The term "carrier" refers to a communication link that operates over a set of contiguous radio frequency resources. A carrier may have dedicated acquisition signaling (e.g., synchronization signals, system information, etc.) and control signaling that coordinates operation over the carrier. In some cases, a carrier may support multiple service types (e.g., which may or may not share subsets of the frequency resources of the carrier). The multiple service types may be associated with respective cells or may be supported by a single cell. The term "cell" refers to a logical communication entity used for communication over the carrier, and may be associated with an identifier for distinguishing neighboring cells (e.g., a physical cell identifier (PCID), a virtual cell identifier (VCID), etc.). In some cases, the term "cell" may refer to a geographic portion of coverage area 110 over which the logical entity operates.

Wireless communication system 100 may support operation on multiple carriers, a feature which may be referred to as carrier aggregation (CA) or multi-carrier operation. For CA, a carrier may also be referred to as a component carrier (CC), and a UE 115 may be configured with multiple downlink CCs and one or more uplink CCs for carrier aggregation. Carrier aggregation may be used with both FDD and TDD component carriers.

Wireless communication system 100 may also support MIMO operation in which multiple concurrent transmissions may share time and frequency resources, and may uniquely modulate a transmission stream with space-time orthogonal codes, such as spatial frequency block codes (SFBC). These spatial resources may be called transmission layers, and the same or different streams of data may be transmitted over different transmission layers. For single-user MIMO (SU-MIMO), multiple transmission layers may be transmitted to the same UE 115, while in multiple user (MU-MIMO), multiple transmission layers may be transmitted to different UEs 115. A capability reported by a UE 115 may take into account the RF chains available at the UE 115 based on such multi-carrier or MIMO operation.

In some cases, wireless communication system 100 may utilize enhanced component carriers (eCCs). An eCC may be characterized by one or more features including: wider bandwidth, shorter symbol duration, and shorter TTIs. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105-a, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable. A 5G or NR carrier may be considered an eCC.

Wireless communication system 100 may operate in an ultra-high frequency (UHF) region using frequency bands from 300 MHz to 3 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. Wireless communication system 100 may also operate in a super high frequency (SHF) region using frequency bands from 3 GHz to 30 GHz, otherwise known as the centimeter band. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length, and systems that use this region may be referred to as millimeter wave (mmW) systems. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions. Techniques disclosed herein may be employed across transmissions that use one or more different frequency regions.

Wireless communication system 100 may be used for communicating information over a number of different services. Such services may include, for example, high data rate services in which relatively large amounts of data are transmitted over communication links 125. Such high data rate services may be used to transmit voice, video, or other data. In some cases, high data rate services may include an eMBB service. Wireless communication system 100 may also provide low latency services with high reliability as may be desired in certain applications (e.g., remote control, wireless automation of production facilities, vehicular traffic efficiency and safety, mobile gaming, etc.). URLLC is an example of a low latency service with high reliability. Wireless communication system 100 may also provide massive machine type communications (mMTC) services, in which UEs 115 may be incorporated into other devices (e.g., meters, vehicles, appliances, machinery, etc.). Such services may have different and independent or quasi-independent air interfaces that may have, for example, different coding/modulation, separate synchronization channels, different master information blocks (MIBs), different system information blocks (SIBs), etc. In some cases, a UE 115 or base station 105-a may identify different services based on the air interface associated with the particular service. These service types may additionally or alternatively be distinguished by different TTI durations, slot durations, transmission durations, supported transmission modes (e.g., CoMP), higher layer processing, etc. In some examples, a carrier may support multiple services (e.g., via multiplexing resources of the carrier in frequency and/or time).

As also indicated above, UL and DL communications may use MIMO transmissions between a base station 105 and UE 115. In some examples, a number of codewords used in MIMO transmissions may be selected to provide enhanced communications for a particular service that is associated with the MIMO transmission. In many cases a larger number of codewords provides a greater spectral efficiency for a transmission, thus resulting in more efficient UL and DL operations. Further efficiencies may be achieved, in some cases, if the receiver can take advantage of two or more codewords to perform interference mitigation, such as successive interference cancellation (SIC), for example. An increased number of codewords in such transmissions also increases complexity associated with modulation/coding and demodulation/decoding, and can increase decoding latency at a receiver. Thus, larger numbers of codewords may be advantageous in communications that are somewhat less latency-sensitive, such as eMBB services or mMTC services, for example. In communications that are more latency sensitive, however, decoding latency associated with additional codewords may not be desirable. Thus, services providing latency-sensitive communications, such as URLLC services, may benefit from fewer codewords needing to be decoded to reduce decoding latency. According to various aspects of the present disclosure, a number of codewords used in MIMO transmissions may be selected based at least in part on the service associated with the MIMO transmission. In such a manner, overall network efficiency may be increased by providing MIMO transmissions with characteristics more beneficial to the associated services.

Furthermore, CB size in MIMO transmissions may have impacts on processing complexity and reliability. In some examples, high-reliability communications, such as URLLC transmissions, may use some form of error correcting coding, and in some cases outer coding may be applied to such transmissions. In some examples, a maximum CB size for a transmission may be selected to provide higher reliability in the case of high reliability or low-latency communications such as URLCC, and may be selected to provide higher throughput in cases where higher throughput is desired such as eMBB. In some examples, a smaller maximum CB size may be selected for URLCC communications, and a larger CB size may be selected for eMBB communications. Additionally, in some cases low latency communications, such as URLLC communications, may be configured to puncture other communications, such as eMBB communications. In cases where such puncturing may occur, or where multiplexing of such communications is anticipated, the CB size for the other communications may be selected based at least in part on the CB size of the low latency communications, in order to enhance the likelihood of being able to still successfully receive both communications even though the low latency communication punctured the other communication.

In the example of FIG. 1, base station 105-a may include a network MIMO manager 101, which may select a number of codewords used in MIMO transmissions to provide enhanced communications for a particular service that is associated with the MIMO transmission. In some examples, a lower-latency service may be identified, and a MIMO transmission configured with one codeword transmitted over a set of spatial layers, which may provide lower processing latency at a receiver relative to processing of multiple codewords. In other examples, a mobile broadband service may be identified, and two (or more) codewords transmitted over the set of spatial layers, which may provide increased data throughput relative to a single codeword MIMO transmission for the given set of spatial layers. The number of codewords in the two or more codewords may depend on the number of spatial layers (e.g., 2 codewords for 4 spatial layers, 4 codewords for 8 spatial layers, etc.) Additionally or alternatively, in some examples, a CB size for a MIMO transmission may be selected based at least in part on a service associated with the MIMO transmission. The network MIMO manager 101 may be an example of a base station MIMO manager 1215 as described below with reference to FIG. 12.

UEs 115 may include a UE MIMO manager 102, which, for UL MIMO, may select a number of codewords used in MIMO transmissions to provide enhanced communications for a particular service that is associated with the MIMO transmission. Similarly to downlink MIMO transmissions, a lower-latency service may be identified, and a corresponding uplink MIMO transmission may be configured with one codeword transmitted over a set of spatial layers to provide lower processing latency at a receiver relative to processing of multiple codewords. In other examples, a mobile broadband service may be identified, and two (or more) codewords may be transmitted over the set of spatial layers to provide increased data throughput relative to a single codeword MIMO transmission for the given set of spatial layers. Additionally or alternatively, a CB size for a MIMO transmission may be selected based at least in part on a service associated with the MIMO transmission. The UE MIMO manager 102 may be an example of a UE MIMO manager 1615 as described below with reference to FIG. 16.

Figure 2:
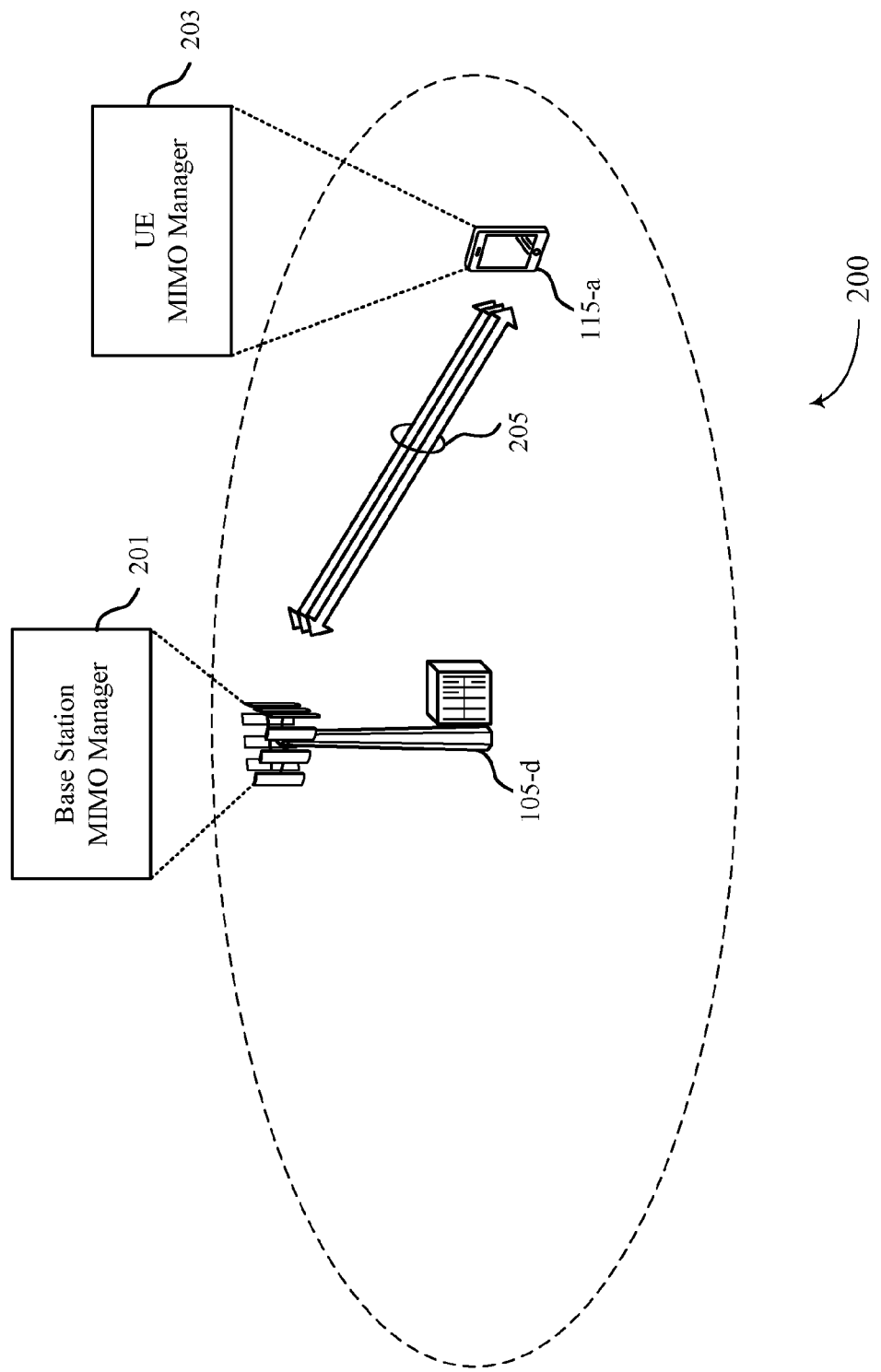
FIG. 2 illustrates an example of a portion of a wireless communication system that supports adaptive codeword and codeblock selection in accordance with aspects of the present disclosure.

FIG. 2 illustrates an example of a portion of a wireless communication system 200 for adaptive codeword and CB selection in wireless communications, in accordance with various aspects of the present disclosure. Wireless communication system 200 may include a base station 105-d and a UE 115-a, which may be examples of the corresponding devices described with reference to FIG. 1. In the example of FIG. 2, the base station 105-d may establish a MIMO connection 205 with the UE 115-a. MIMO connection 205 may be an example of a carrier that is capable of supporting one or more different service types. In the example of FIG. 2, the wireless communication system may operate according to a radio access technology (RAT) such as a 5G or NR, although techniques described herein may be applied to any RAT and to systems that may concurrently use two or more different RATs.

As indicated above, in some examples the wireless communication system 200 may be a portion of a NR or 5G network. Based on growing demand for data and throughput anticipated for 5G, efficient use of RF spectrum may be necessary to support communications. Adaptive codeword and CB selection as discussed herein may contribute to such efficient RF spectrum use. For example, in some LTE/LTE-A deployments, two codewords may be used for MIMO transmissions via two or more layers, where each codeword is associated with a respective transport block. Correspondingly, two HARQ ACK/NACK bits may be generated for each of the codewords. Additionally, for any new packet MIMO transmission, two codewords may always be used. However, for retransmissions, it may be possible to have a single codeword mapped to two or more layers in the event that one of the codewords of the initial transmission is successfully received. Additionally, in some LTE deployments, each codeword may be split into multiple CBs, with each CB being up to 6144 bits and each CB is associated with a cyclic redundancy check (CRC). As indicated above, a 5G or NR network may support multiple types of services, such as eMBB, URLLC, mMTC, etc. Additionally, UEs 115 of different capabilities may be present in such a network, such as UEs 115 capable of providing HARQ feedback within a same slot as well as UEs 115 capable of providing HARQ feedback in a next slot. Additionally, in some cases HARQ feedback latency in a 5G or NR network may be semi-statically or dynamically changed, where a first packet may have a HARQ feedback latency of 1-slot, while a second packet may have a 2-slot HARQ response time. Additionally, for URLCC services, outer coding, which may be performed on a per CB basis, may be applied to improve reliability. Various aspects of the disclosure provide techniques to adaptively select a number of codewords for MIMO transmissions, and/or adaptively select a CB size for MIMO transmissions, based on one or more factors associated with the MIMO transmission.

In some examples, the base station 105-d may include a base station MIMO manager 201, which may be an example of network MIMO manager 101 of FIG. 1, and may be used to select a number of codewords for a MIMO transmission to be transmitted via connection 205 based on a service of the transmission. In some cases, the number of codewords selected for a given set of spatial layers may be based on a capability of the UE 115-a, scheduling conditions, one or more services being provided, or any combination thereof. Additionally or alternatively, a CB size for a MIMO transmission may be selected based at least in part on a service of the transmission. The base station MIMO manager 201 may be an example of a base station MIMO manager 1215 as described below with reference to FIG. 12.

The UE 115-a may include a UE MIMO manager 202, which may be an example of UE MIMO manager 102 of FIG. 1, and each of which may be used to select a number of codewords for an UL MIMO transmission to be transmitted via connection 205 based on a service of the transmission. In some cases, the number of codewords may be based on a capability of the UE 115-a, scheduling conditions, one or more services being provided, or any combination thereof. Additionally or alternatively, a CB size for a MIMO transmission may be selected based at least in part on a service of the transmission. The UE MIMO manager 202 may be an example of a UE MIMO manager 1615 as described below with reference to FIG. 16.

Figure 3A:
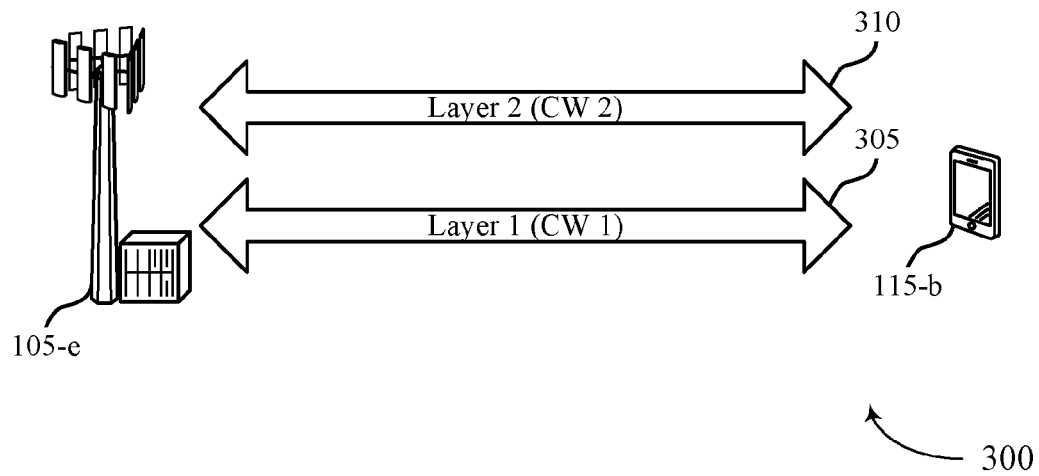
FIGS. 3A and 3B illustrate examples of MIMO transmissions that support adaptive codeword and codeblock selection in wireless communications in accordance with aspects of the present disclosure.

FIG. 3A illustrates an example of first MIMO transmissions 300 for adaptive codeword and codeblock selection in wireless communications in accordance with various aspects of the disclosure. First MIMO transmissions 300 may be transmitted between a first base station 105-e and a first UE 115-b, which may be examples of the corresponding devices described with reference to FIGS. 1 and 2. In the example of FIG. 3A, the first base station 105-e may establish a first MIMO connection having a first layer 305 that may be used to transmit a first codeword and a second layer 310 that may be used to transmit a second codeword. In other examples, the first base station 105-e may transmit the first and second codewords via more than two layers. For example, each of the two codewords may be mapped to half the total number of layers for even numbers of layers, while for odd numbers of layers the first codeword may be mapped to (N−1)/2 layers and the second codeword may be mapped to (N+1)/2 layers.

Figure 3B:
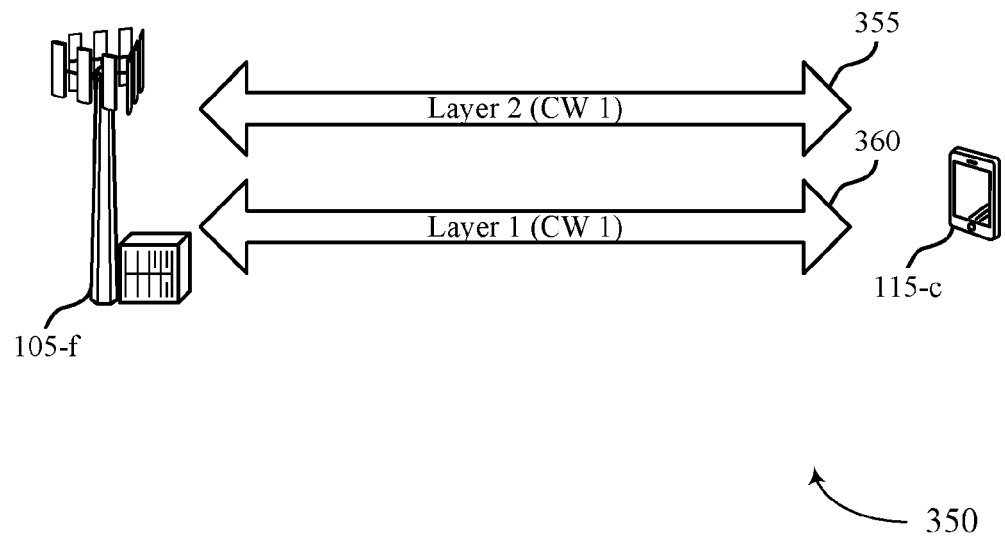

FIG. 3B illustrates an example of second MIMO transmissions 350 for adaptive codeword and codeblock selection in wireless communications in accordance with various aspects of the disclosure. Second MIMO transmissions 350 may be transmitted between a second base station 105-f and a second UE 115-c, which may be examples of the corresponding devices described with reference to FIGS. 1 and 2. In the example of FIG. 3B, the second base station 105-f may establish second MIMO connection having a first layer 355 that may be used to transmit portions of a first codeword, and a second layer 360 that may be used to transmit other portions of the first codeword. For example, alternating bits (or sets of n bits) of the codeword may be transmitted on the first layer 355 and the second layer 360.

In the examples of FIGS. 3A and 3B, the respective base station 105 may select the number of codewords to be transmitted in the associated MIMO transmission based on a service being supported by the MIMO transmission and the number of layers. For example, first MIMO transmissions 300 may include eMBB data for an eMBB service and may be configured with multiple codewords for the given set of layers. Second MIMO transmission 350 may include URLLC data for an URLLC service and may be configured with a single codeword for the given set of layers. Thus, the first MIMO transmissions 300 may have higher spectral efficiency but higher latency for a given set of MIMO layers, which is more suitable for eMBB services, and second MIMO transmissions 350 may have lower latency with somewhat lower spectral efficiency, which is more suitable for URLLC services. In some examples, different numbers of codewords may be used for the high data rate service (e.g., eMBB) depending on the numbers of layers (e.g., 2 codewords for 3 or more layers, 2 codewords for 4 or more layers, 4 codewords for 4 or more layers, etc.) while the low latency service (e.g., URLLC) may use one codeword independent of the number of layers in the MIMO transmissions 300 or 350. Alternatively, the high data rate service may use one codeword independent of the number of layers in the MIMO transmissions 300 or 350 while the low latency service uses different numbers of codewords depending on the number of layers.

In some examples, HARQ processes at the UEs 115 may be configured based on the number of transmitted codewords in a transmission. For example, a single HARQ process, or a first HARQ response timing, may be associated with the single codeword second MIMO transmissions 350, while two HARQ processes, or a more relaxed second HARQ response timing, may be associated with the two codeword first MIMO transmissions 300.

Additionally or alternatively, a base station 105 may select a number of codewords for a MIMO transmission based on UE 115 capability. For example, first MIMO transmissions 300 and second MIMO transmissions 350 may both support eMBB services, and the first UE 115-b may be a higher capability UE 115 while second UE 115-c is a lower capability UE 115. In this example, first UE 115-b may have a relatively large amount of available processing capability, which may be reported to the first base station 105-e, and which the first base station 105-e may use to determine that the first UE 115-b is capable of processing two codewords within processing timelines. Likewise, second UE 115-c may have a relatively smaller amount of available processing capability (e.g., due to being an MTC-type UE, a thermally limited UE, a power limited UE, etc.) which may be reported to the second base station 105-f, and which the second base station 105-f may use to determine that the second UE 115-c is limited to processing one codeword within processing timelines. In some examples, the second MIMO transmissions 350 (using a single codeword over multiple MIMO layers) may have two MCSs that may be applied, such as a first MCS for the first layer 355 transmission and a second MCS for the second layer 360 transmission. In some examples, a combined modulation and coding rate may be determined for the second MIMO transmissions 350, and a modulation order for the first layer 355 and the second layer 360 may be selected based at least in part on the combined modulation and coding rate.

In other examples, a base station 105 may select a number of codewords for a MIMO transmission based on scheduling conditions, such as an amount of data to be transmitted or a channel quality associated with a UE 115. For example, first MIMO transmissions 300 and second MIMO transmissions 350 may both support eMBB services, where the first UE 115-b is experiencing relatively good channel conditions while second UE 115-c is experiencing relatively poor channel conditions. Likewise, an amount of data present for transmission between first UE 115-b and first base station 105-e may be relatively large, and an amount of data for transmission between second UE 115-c and second base station 105-f may be relatively small. In each of these examples, the first base station 105-e may determine that two codewords are to be used for the first MIMO transmissions 300, and the second base station 105-f may determine that one codeword is to be used for the second MIMO transmissions 350.

Figure 4A:
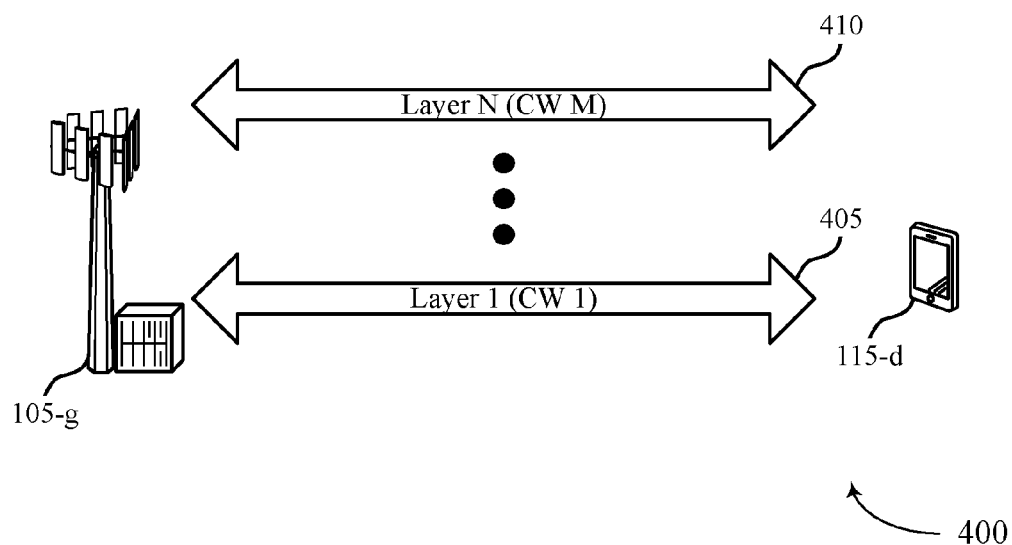
FIGS. 4A and 4B illustrate further examples of MIMO transmissions that support adaptive codeword and codeblock selection in wireless communications in accordance with aspects of the present disclosure.

FIG. 4A illustrates an example of third MIMO transmissions 400 for adaptive codeword and codeblock selection in wireless communications in accordance with various aspects of the disclosure. Third MIMO transmissions 400 may be transmitted between a third base station 105-g and a third UE 115-d, which may be examples of the corresponding devices described with reference to FIGS. 1-3B. In the example of FIG. 4A, the third base station 105-e may establish a third MIMO connection having N layers, including a first layer 405 that may be used to transmit a first codeword and other layers that may be used to transmit other codewords up to an Nth layer 410 that may be used to transmit a codeword M, where M may be equal to or less than N. For example, third base station 105-g may establish four layers, and use four codewords for transmissions. Similarly as discussed above, the number of codewords used for third MIMO transmissions 400 may be selected based on a service type associated with the transmissions, a UE 115-d capability, scheduling conditions, or any combination thereof.

Figure 4B:
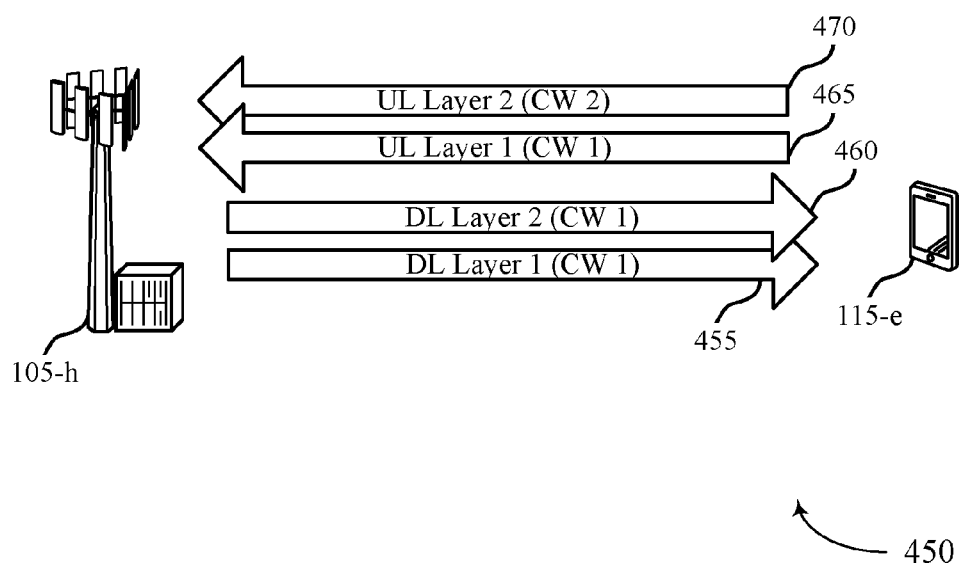

FIG. 4B illustrates an example of fourth MIMO transmissions 450 for adaptive codeword and codeblock selection in wireless communications in accordance with various aspects of the disclosure. Fourth MIMO transmissions 450 may be transmitted between a fourth base station 105-*h* and a fourth UE 115-*e*, which may be examples of the corresponding devices described with reference to FIGS. 1 through 4A. In the example of FIG. 4B, the fourth base station 105-*h* may establish fourth MIMO connection having downlink layers 455 and 460, and uplink layers 465 and 470. In this example, the downlink layers 455 and 460 have one codeword, and the uplink layers 465 and 470 have two codewords. In this example, the fourth base station 150-*h* may have significantly more processing power than the fourth UE 115-*e*, and thus the uplink transmissions may use more codewords than the downlink transmissions.

Figure 5:
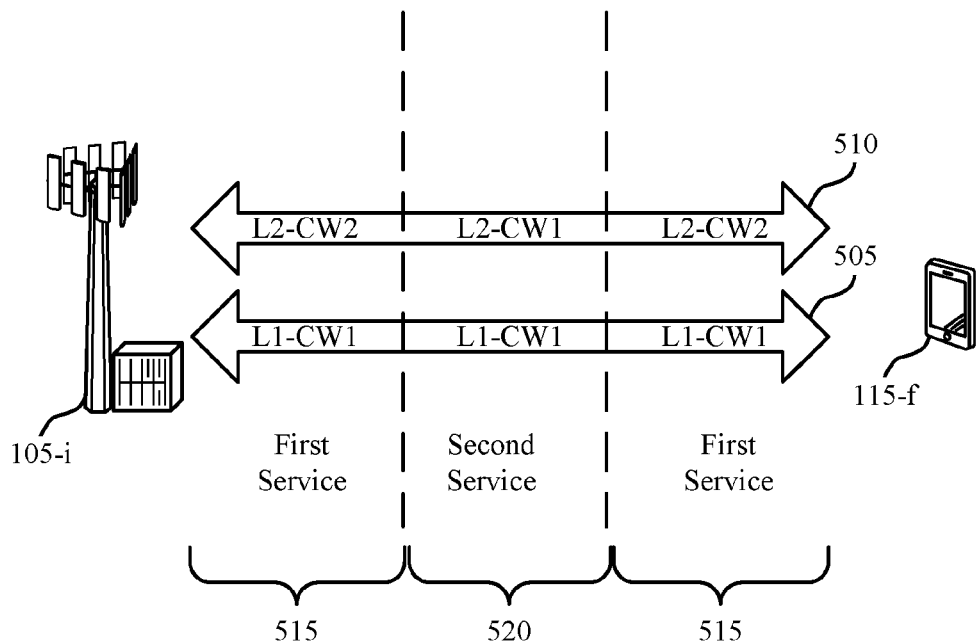
FIG. 5 illustrates an example of MIMO transmissions with multiple services that support adaptive codeword and codeblock selection in wireless communications in accordance with aspects of the present disclosure.

FIG. 5 illustrates an example of MIMO transmissions 500 with multiple services that support adaptive codeword and codeblock selection in wireless communications in accordance with aspects of the present disclosure. MIMO transmissions 500 may be transmitted between a base station 105-*i* and a UE 115-*f*, which may be examples of the corresponding devices described with reference to FIGS. 1 through 4B. In the example of FIG. 5, the base station 105-*i* may establish MIMO transmissions 500 having two layers, including a first layer 505 that may be used to transmit a first codeword of a first service 515, and a second layer 510 that may be used to transmit a second codeword of the first service 515. In this example, the MIMO transmissions 500 may be established based on the first service 515, such as eMBB, but a second service 520, such as URLLC, may have higher priority and may puncture the first service 515. In this example, the second service 520 may use two layers for transmission of a single codeword. In other examples, different numbers of codewords may be used for the first service depending the numbers of layers, while the second service may use one codeword independent of the number of layers in the MIMO transmissions 500.

Thus, the first layer 505 initially includes a first codeword for the first service 515, which is then multiplexed with the first codeword of the second service 520, followed again by the first codeword of the first service 515. Likewise, the second layer 510 initially includes a second codeword for the first service 515, which is then multiplexed with the first codeword of the second service 520 (e.g., or a second codeword of the second service 520), followed again by the second codeword of the first service 515. Thus, the transmissions of the first service may be punctured by transmissions of the second service, and the different layers of the MIMO transmissions 500 may be used to transmit different numbers of codewords. In some examples, in anticipation of potential puncturing, the base station 105-*i* or UE 115-*f* may select a CB size for the first service 515 to provide a higher likelihood of successful reception even though the transmission was punctured. In some examples, different scrambling sequences may be applied to the first service 515 and the second service 520, which may be used at a receiver to differentiate the two services.

Figure 6:
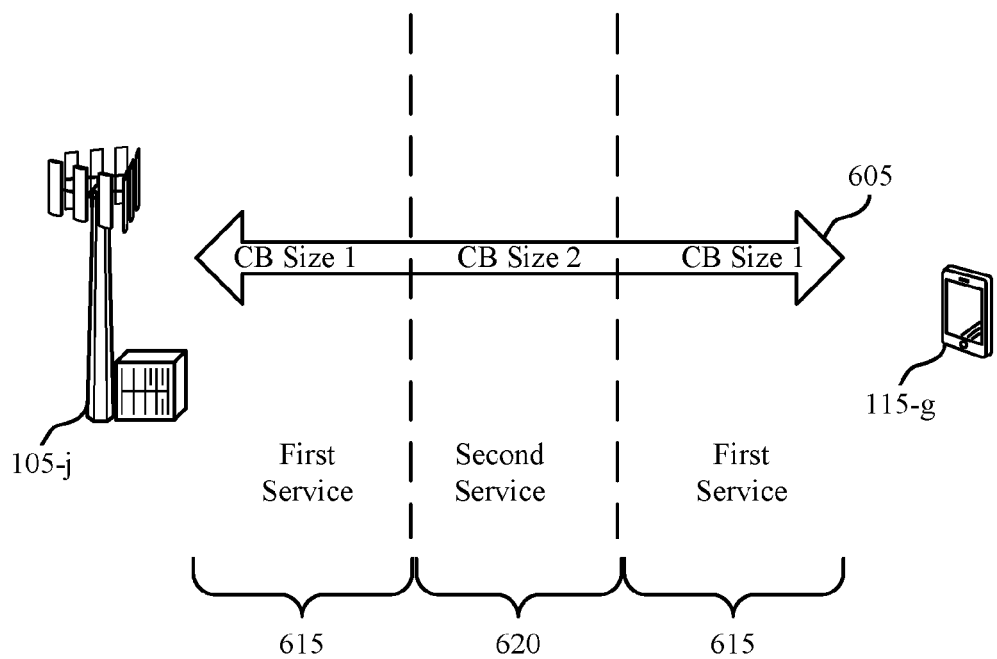
FIG. 6 illustrates an example of MIMO transmissions that supports adaptive codeword and codeblock selection in wireless communications in accordance with aspects of the present disclosure.

FIG. 6 illustrates an example of transmissions 600 for adaptive codeword and codeblock selection in wireless communications in accordance with aspects of the present disclosure. Transmissions 600 may be transmitted between a base station 105-*j* and a UE 115-*g*, which may be examples of the corresponding devices described with reference to FIGS. 1 through 5. In the example of FIG. 6, the base station 105-*j* may establish transmissions 600 having a single layer 605, although these techniques are equally applicable to MIMO transmissions having multiple layers. The CB size for transmissions on layer 605 may, in some examples, be selected based on a service type of the transmissions 600. For example, a URLLC service type may be configured to have a maximum CB size of 1024 bits, and an eMBB service type may be configured to have a maximum CB size of 6144 bits. In the example of FIG. 6, a first service 615 is served by layer 605, which may be punctured by second service 620. First service 615 may be, for example, an eMBB service having a first CB size, and the second service 620 may be a URLLC service having a second CB size that is smaller than the first CB size. A smaller CB size may, for example, provide more CRC protection, allow for more efficient outer coding, and enhance the possibility for early decoding, at the expense of some efficiency loss.

In some examples, a maximum CB size for eMBB transmissions may be dynamically or semi-statically configured to better manage URLLC multiplexing or puncturing, or potential application of outer coding. Such dynamic or semi-static configuration may be based on a likelihood of URLLC transmissions and an average length of the URLLC transmissions, for example. This information may be used to set a reduced CB size for eMBB data. In such cases, there is some efficiency loss due to smaller CB sizes, but this may be made up by requiring fewer retransmissions of the eMBB transmissions.

Figure 7:
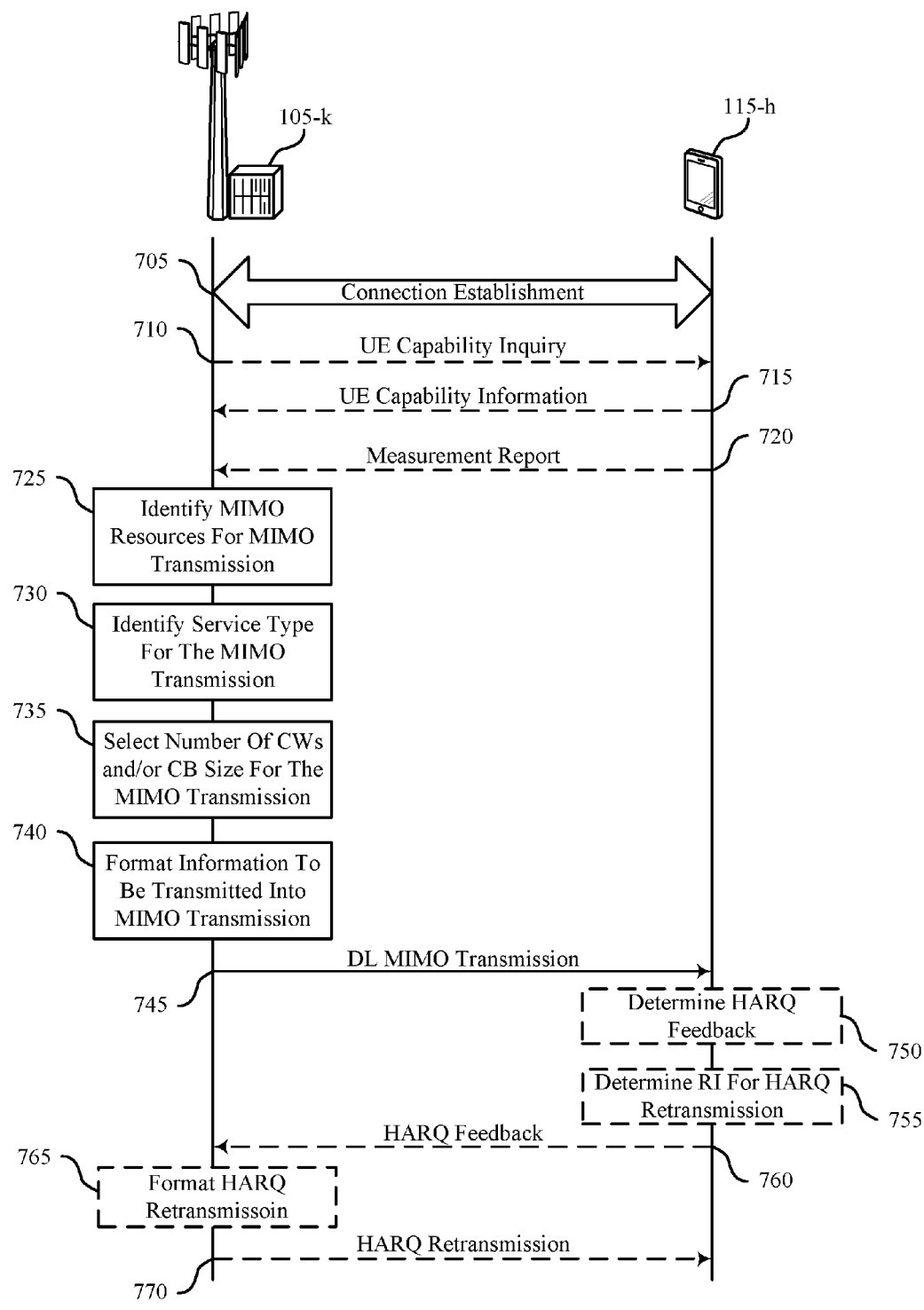
FIG. 7 illustrates an example of a process flow that supports adaptive codeword and codeblock selection in wireless communications in accordance with aspects of the present disclosure.

FIG. 7 illustrates an example of a process flow 700 for adaptive codeword and codeblock selection in wireless communications. Process flow 700 may include a base station 105-*k* and a UE 115-*h*, which may be examples of the corresponding devices described with reference to FIGS. 1 through 6. The base station 105-*k* and UE 115-*h* may establish a connection at 705 via a carrier that supports multiple different service types, such as URLLC, eMBB, and mMTC, for example. The base station 105-*k* may optionally transmit a UE capability inquiry 710 to the UE 115-*h*, and the UE 115-*h* may transmit UE capability information 715 responsive thereto. In some examples, UE capability information 715 may be used by the base station 105-*k* to determine whether MIMO transmissions with the UE 115-*h* are configured with one codeword or more than one codeword, as discussed above with respect to FIGS. 2 through 6. UE 115-*h* may also optionally transmit a measurement report 720 to the base station 105-*k*, which may include information related to wireless communications channels, such as channel quality information (CQI), a rank indicator (RI) that indicates a maximum transmission rank supported by the UE 115-*h*, and/or a precoding matrix indicator (PMI) that may be used to indicate a preferred set of weights to be applied during the precoding process. Information from the measurement report 720 may be used, in some examples, as one or more scheduling conditions for selection of a number of codewords to be used in a MIMO transmission, as discussed above.

At 725, the base station 105-*k* may identify MIMO resources for a MIMO transmission to the UE 115-*h*. The base station 105-*k* may identify MIMO resources according to a resource allocation process that may run at the base station 105-*k* and allocate resources to a number of different UEs 115 based on various considerations, such as quality-of-service (QoS) requirements for different UEs 115, latency requirements of the different UEs 115, an amount of data to be transmitted to the different UEs 115, an elapsed time that data has been buffered for transmission, various other factors, or any combination thereof. The MIMO resources may be for a carrier that supports a number of different service types, as discussed above.

At block 730, the base station 105-*k* may identify a service type for the MIMO transmission. As discussed above, a carrier may support multiple different and/or independent service types, such as URLLC, eMBB, and mMTC, for example. The service type may be identified based on, for example, an air interface used by the service type that may be identified through different types of connection establishment for different service types that may have different coding/modulation, different synchronization channels, different MIBs/SIBs, different random access procedures, or any combination thereof. Different service types may also be identified, for example, based on signaling from higher layers, a sequence pattern applied to the data of the different service types, packet inspection, or combinations thereof.

At 735, the base station 105-*k* may select a number of codewords and/or a CB size for the MIMO transmission. The selection of the number of codewords may be based at least in part on the service type for the transmission, scheduling conditions associated with the transmission, UE capability, or any combination thereof, as discussed above. For example, for a first service type (e.g., eMBB), the selection of number of codewords may be dependent on the number of layers, while the selection of number of codewords for a second service type (e.g., URLLC) is independent of the number of layers. The selection of the CB size may be based at least in part on the service type for the transmission, a likelihood that other service types will be multiplexed with the identified service type, of any combination thereof, as discussed above.

At 740, the base station 105-*k* may format information to be transmitted into the selected codewords for transmission in the MIMO transmission. In some cases, the base station 105-*k* may segment the information to be transmitted into CBs according to the selected CB size, and append a CRC to each CB. In some examples, additional coding may be applied to the CBs to enhance error correction at the receiving UE 115-*h*.

The base station 105-*k* may transmit the DL MIMO transmission 745 to the UE 115-*h*. The UE 115-*h* may receive the DL MIMO transmission 745, and demodulate/decode the transmission. At 750, the UE 115-*h* may optionally determine HARQ feedback for the DL MIMO transmission according to a HARQ process, if configured. The HARQ process may generate an acknowledgment (ACK) or a negative acknowledgment (NACK) based on whether the information from the transmission is successfully demodulated and decoded.

In some examples, if the information is not successfully received at the UE 115-*h*, the UE 115-*h* may optionally determine a RI for a HARQ retransmission of the unsuccessfully received transmission, as indicated at 755. In such examples, the UE 115-*h* may perform one or more measurements and may determine that the reception was unsuccessful due to one or more layers of the MIMO transmission having poor channel quality. The RI may be determined based on the measurements, and transmitted back to the base station 105-*k* along with HARQ feedback 760. The base station 105-*k* may receive the HARQ feedback 760, which may be a NACK along with a RI, and determine that a HARQ retransmission is to be transmitted using fewer layers than the original MIMO transmission.

At 765, the base station 105-*k* may optionally format the HARQ retransmission according to the RI indicated in the HARQ feedback 760 from the UE 115-*h*. In cases where the RI indicated is less than the rank used for the initial MIMO transmission, the base station 105-*k* may format the retransmission to be transmitted on fewer layers than the initial transmission. For example, if the original transmission has one codeword mapped to four transmission layers, and the RI with the HARQ feedback indicated a RI of two layers, the base station 105-*k* may format the retransmission to have one codeword that is mapped to two layers. The base station 105-*k* may then transmit HARQ retransmission 770 to the UE 115-*h*.

Figure 8:
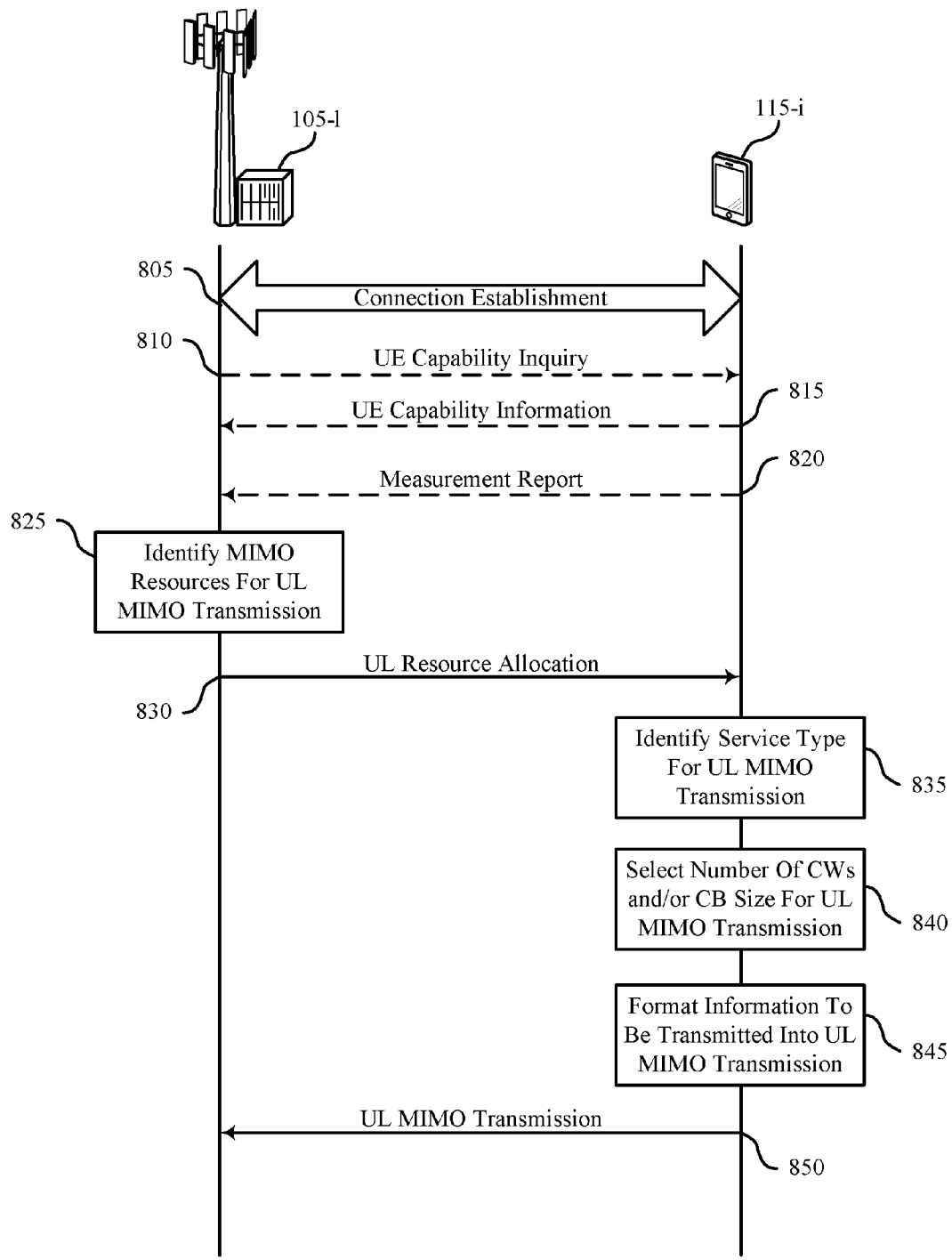
FIG. 8 illustrates an example of a process flow that supports adaptive codeword and codeblock selection in wireless communications in accordance with aspects of the present disclosure.

FIG. 8 illustrates an example of a process flow 800 for adaptive codeword and codeblock selection in wireless communications. Process flow 800 may include a base station 105-*l* and a UE 115-*i*, which may be examples of the corresponding devices described with reference to FIGS. 1 through 7. The base station 105-*l* and UE 115-*i* may establish a connection at 805 that supports a carrier that may support multiple different service types, such as URLLC, eMBB, and mMTC, for example. The base station 105-*l* may optionally transmit a UE capability inquiry 810 to the UE 115-*i*, and the UE 115-*i* may transmit UE capability information 815 responsive thereto. As discussed above, in some examples the UE capability information 815 may be used by the base station 105-*l* to determine whether MIMO transmissions with the UE 115-*i* are configured with one codeword or more than one codeword, as described above with respect to FIGS. 2 through 6. UE 115-*i* may also optionally transmit a measurement report 820 to the base station 105-*l*, which may include information related to wireless communications channels, such as CQI, a RI that indicates a maximum transmission rank supported by the UE 115-*i*, and/or a PMI that may be used to indicate a preferred set of weights to be applied during the precoding process. Information from the measurement report 820 may be used, in some examples, as one or more scheduling conditions that may be used in a selection of a number of codewords to be used in a MIMO transmission, as discussed above.

At 825, the base station 105-*l* may identify MIMO resources for a UL MIMO transmission to the UE 115-*i*. The base station 105-*l* may identify MIMO resources according to a resource allocation process that may run at the base station 105-*l* and allocate resources to a number of different UEs based on various considerations, such as QoS requirements for different UEs, latency requirements of the different UEs, an amount of data to be transmitted to the different UEs, an elapsed time that data has been buffered for transmission, various other factors, or any combination thereof. The MIMO resources may be for a carrier that supports a number of different service types, as discussed above. The base station 105-*l* may transmit the uplink resource allocation 830 to the UE 115-*i*.

At 835, the UE 115-*i* may identify a service type for the UL MIMO transmission. As discussed above, a carrier may support multiple different and/or independent service types, such as URLLC, eMBB, and mMTC, for example. The service type may be identified based on, for example, an air interface used by the service type that may be identified through, for example, different types of connection establishment for different service types that may have different coding/modulation, different synchronization channels, different MIBs/SIBs, or any combination thereof. Different service types may also be identified, for example, based on signaling from higher layers, a sequence pattern applied to the data of the different service types, packet inspection, an indication in the UL resource allocation, or combinations thereof.

At 840, the UE 115-*i* may select a number of codewords and/or a CB size for the UL MIMO transmission. The selection of the number of codewords may be based at least in part on the service type for the transmission, scheduling conditions associated with the transmission, UE capability, or any combination thereof, as discussed above. For example, for a first service type (e.g., eMBB), the selection of the number of codewords may be dependent on the number of layers, while the selection of the number of codewords for a second service type (e.g., URLLC) is independent of the number of layers. Alternatively, the selection of number of codewords may be dependent on the number of layers for the second service type (e.g., URLLC), while the selection of the number of codewords for the first service type (e.g., eMBB) is independent of the number of layers. The selection of the CB size may be based at least in part on the service type for the transmission, a likelihood that other service types will be multiplexed with the identified service type, or any combination thereof, as discussed above.

At 845, the UE 115-*i* may format information to be transmitted into the selected codewords for transmission in the UL MIMO transmission. In some cases, the UE 115-*i* may segment the information to be transmitted into CBs according to the selected CB size, and append a CRC to each CB. The UE 115-*i* may then transmit the UL MIMO transmission 850 to the base station 105-*l*.

Figure 9:
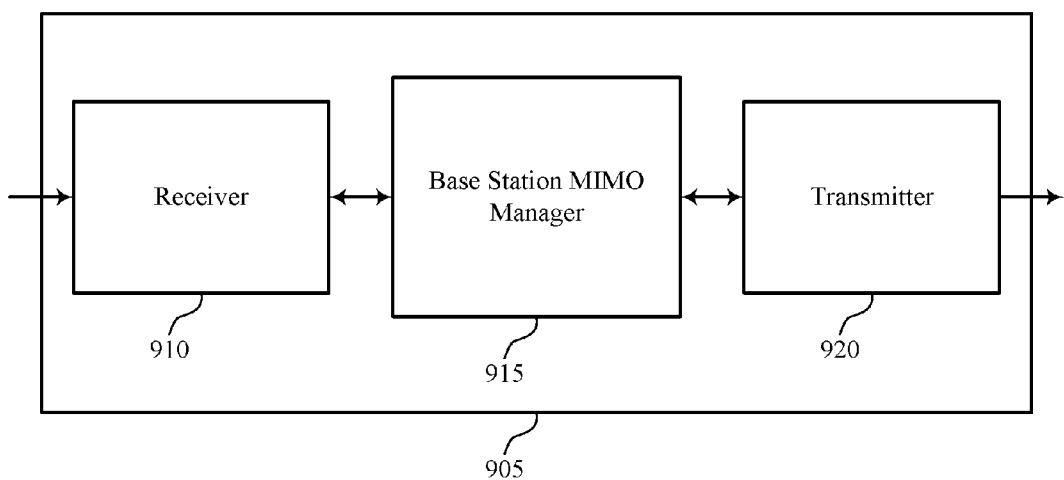
FIGS. 9 through 11 show block diagrams of a device that supports adaptive codeword and codeblock selection in wireless communications in accordance with aspects of the present disclosure.

FIG. 9 shows a block diagram 900 of a device 905 that supports adaptive codeword and codeblock selection in wireless communications in accordance with various aspects of the present disclosure. Device 905 may be an example of aspects of a base station 105 as described with reference to FIGS. 1 through 8. Device 905 may include receiver 910, base station MIMO manager 915, and transmitter 920. Device 905 may also include a processor. Each of these components may be in communication with one another (e.g., via one or more buses).

Receiver 910 may receive information such as packets, user data, or control information associated with various information channels (e.g., control channels, data channels, and information related to adaptive codeword and codeblock size selection in wireless communications, etc.). Information may be passed on to other components of the device. The receiver 910 may be an example of aspects of the transceiver 1235 described with reference to FIG. 12.

Base station MIMO manager 915 may be an example of aspects of the network MIMO manager 101, the base station MIMO manager 201, or the base station MIMO manager 1215 described with reference to FIG. 1, 2, or 12. Base station MIMO manager 915 may identify, for a carrier supporting a set of service types, resources for a first MIMO transmission to a UE, identify a first service type associated with the first MIMO transmission, select a first number of codewords to be transmitted in the first MIMO transmission based on the first service type, and format information to be transmitted into one or more codewords corresponding to the selected first number of codewords. The base station MIMO manager 915 may also identify, for a carrier supporting a set of service types, resources for a first MIMO transmission to a UE, identify a first service type associated with the first MIMO transmission, select a first CB size for one or more CBs to be transmitted in one or more codewords of the first MIMO transmission based on the first service type, and format information to be transmitted into the one or more CBs.

Transmitter 920 may transmit signals generated by other components of the device. In some examples, the transmitter 920 may be collocated with a receiver 910 in a transceiver. For example, the transmitter 920 may be an example of aspects of the transceiver 1235 described with reference to FIG. 12. The transmitter 920 may include a single antenna, or it may include a set of antennas. Transmitter 920 may transmit the one or more codewords in the first MIMO transmission to the UE and transmit the one or more CBs in the first MIMO transmission to the UE.

Figure 10:
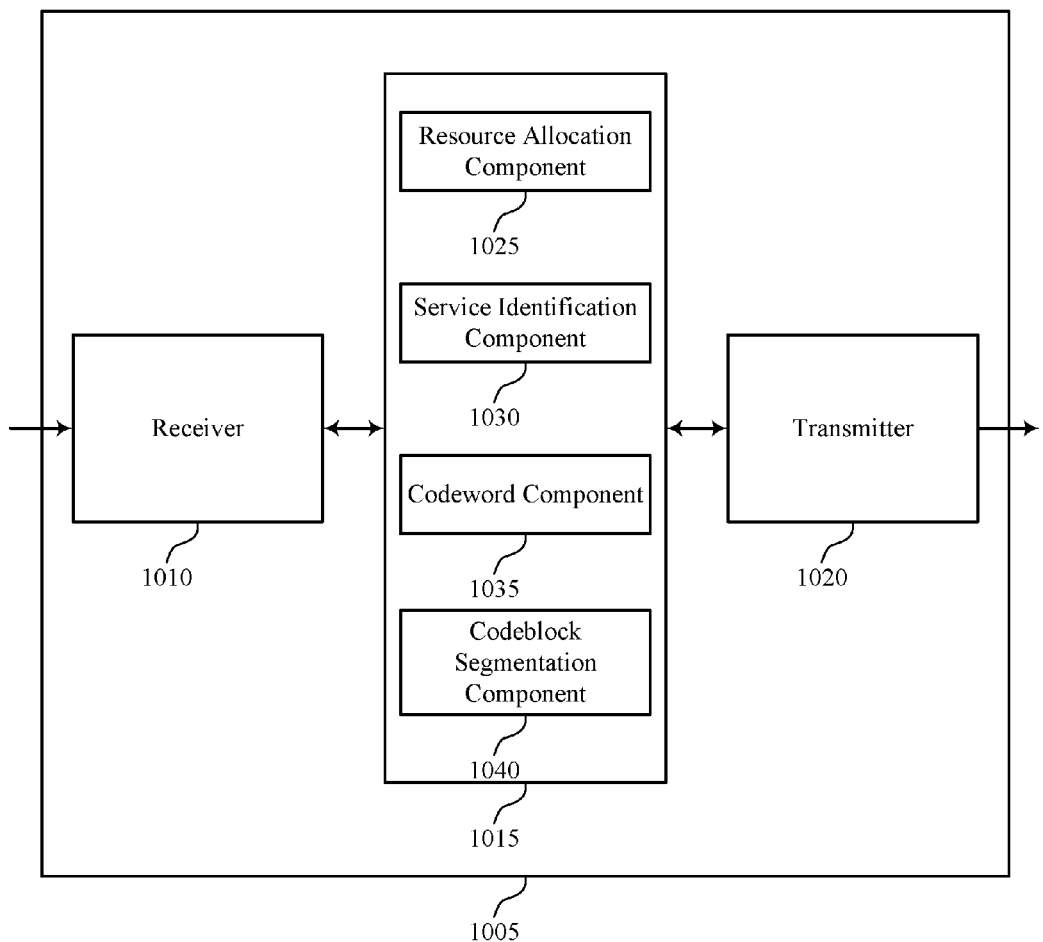

FIG. 10 shows a block diagram 1000 of a device 1005 that supports adaptive codeword and codeblock selection in wireless communications in accordance with various aspects of the present disclosure. Device 1005 may be an example of aspects of a device 905 or a base station 105 as described with reference to FIGS. 1 through 9. Device 1005 may include receiver 1010, base station MIMO manager 1015, and transmitter 1020. Device 1005 may also include a processor. Each of these components may be in communication with one another (e.g., via one or more buses).

Receiver 1010 may receive information such as packets, user data, or control information associated with various information channels (e.g., control channels, data channels, and information related to adaptive codeword and codeblock selection in wireless communications, etc.). Information may be passed on to other components of the device. The receiver 1010 may be an example of aspects of the transceiver 1235 described with reference to FIG. 12.

Base station MIMO manager 1015 may be an example of aspects of the network MIMO manager 101, the base station MIMO manager 201, or the base station MIMO manager 1215 described with reference to FIG. 1, 2, or 12. Base station MIMO manager 1015 may also include resource allocation component 1025, service identification component 1030, codeword component 1035, and CB segmentation component 1040.

Resource allocation component 1025 may identify, for a carrier supporting a set of service types, resources for the first MIMO transmission to a UE and may identify, for the carrier, second resources for a second MIMO transmission to the UE.

Service identification component 1030 may identify a first service type associated with the first MIMO transmission, identify a second service type associated with the second MIMO transmission, where the second service type is different from the first service type, and may configure the second service type for the carrier that is multiplexed with the first MIMO transmission. Such multiplexing may occur when data associated with the second service type is to be transmitted, and where the second service type is a higher priority service type than the first service type. In some cases, the selecting the first CB size may be based on a second CB size associated with the second service type. In some cases, the set of service types includes a high-reliability and low-latency service type, a mobile broadband service type, a MTC service type, or combinations thereof. In some cases, the first service type is a mobile broadband service type and the second service type is a high-reliability and low-latency service type.

Codeword component 1035 may select a first number of codewords to be transmitted in the first MIMO transmission based on the first service type, and format information to be transmitted into one or more codewords corresponding to the selected first number of codewords. In cases where an uplink MIMO transmission is to be transmitted, codeword component 1035 may identify a second number of codewords for an uplink MIMO transmission to be transmitted by the UE based on an uplink service type associated with the uplink MIMO transmission. In some examples, codeword component 1035 may determine that the first MIMO transmission is to be transmitted from multiple transmitters to the UE according to a CoMP transmission technique (e.g., non-coherent CoMP), and select the number of codewords based on the CoMP transmission technique. In some cases, a second number of codewords for transmission of information to be transmitted in the second MIMO transmission may be identified based on the second service type associated with the second MIMO transmission, where the second number of codewords is different from the first number of codewords. In some cases, the first service type is an URLLC service type, and selecting the first number of codewords includes selecting one codeword for the first MIMO transmission. In some cases, the first service type is an eMBB service type, and selecting the first number of codewords includes selecting a set of multiple codewords for the first MIMO transmission. In some cases, the second number of codewords is greater than the first number of codewords. In some cases, the selecting the first number of codewords is further based on the CoMP transmission technique, with two or more codewords selected when the CoMP transmission technique is a non-coherent CoMP transmission, and one codeword selected when the CoMP transmission technique is a coherent CoMP transmission.

Codeblock segmentation component 1040 may select a first CB size for one or more CBs to be transmitted in one or more codewords of the first MIMO transmission based on the first service type and format information to be transmitted into the one or more CBs. In some cases, the first CB size is selected to be a first number of bits when the first service type is a mobile broadband service type, and the first CB size is selected to be a second number of bits when the first service type is a high-reliability and low-latency service type, and where the second number of bits is smaller than the first number of bits. In some cases, the first CB size is selected to be smaller than a maximum CB size for the first service type when the second service type is configured.

Transmitter 1020 may transmit signals generated by other components of the device. In some examples, the transmitter 1020 may be collocated with a receiver 1010 in a transceiver. For example, the transmitter 1020 may be an example of aspects of the transceiver 1235 described with reference to FIG. 12. The transmitter 1020 may include a single antenna, or it may include a set of antennas.

Figure 11:
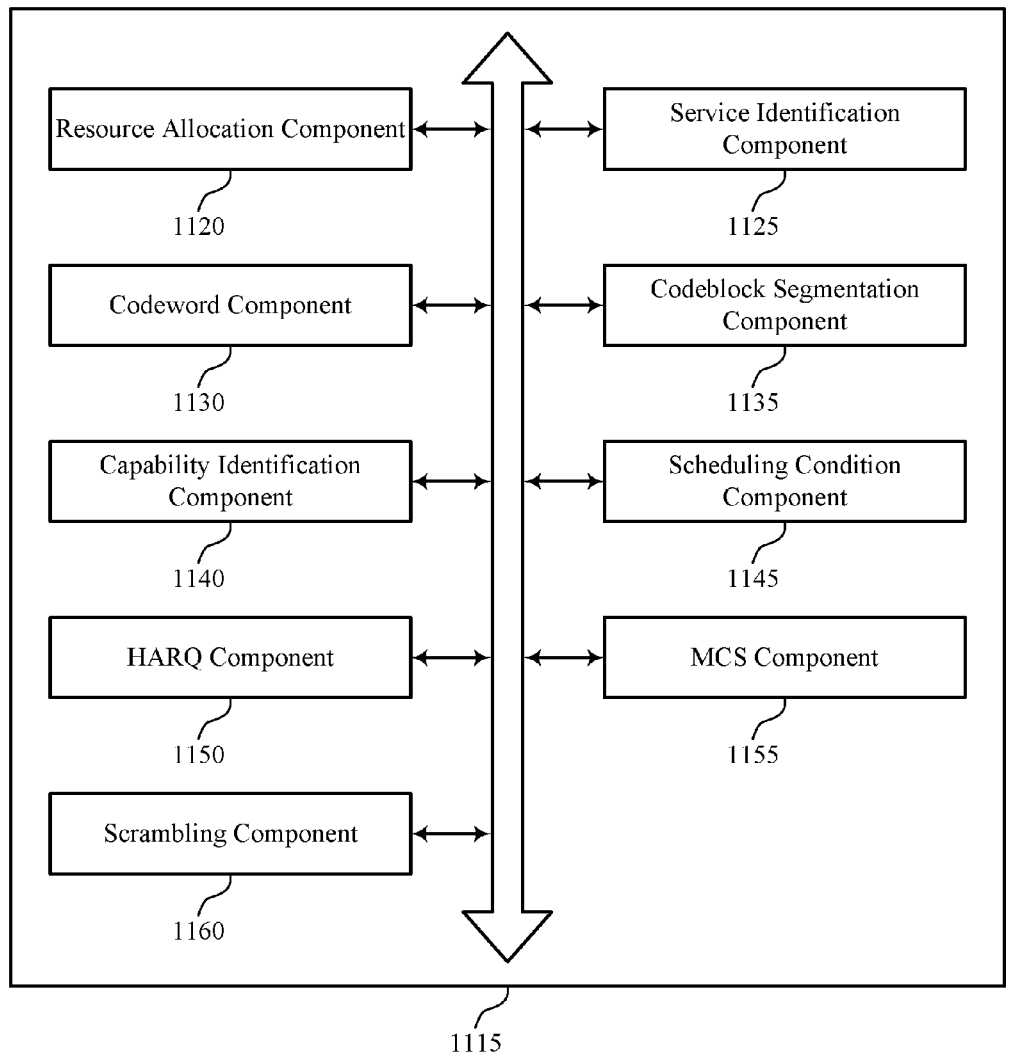

FIG. 11 shows a block diagram 1100 of a base station MIMO manager 1115 that supports adaptive codeword and codeblock selection in wireless communications in accordance with various aspects of the present disclosure. The base station MIMO manager 1115 may be an example of aspects of a network MIMO manager 101, a base station MIMO manager 201, a base station MIMO manager 915, a base station MIMO manager 1015, or a base station MIMO manager 1215 described with reference to FIGS. 1, 2, 9, 10, and 12. The base station MIMO manager 1115 may include resource allocation component 1120, service identification component 1125, codeword component 1130, codeblock segmentation component 1135, capability identification component 1140, scheduling condition component 1145, HARQ component 1150, MCS component 1155, and scrambling component 1160. Each of these components may communicate, directly or indirectly, with one another (e.g., via one or more buses).

Resource allocation component 1120 may identify, for a carrier supporting a set of service types, resources for a first MIMO transmission to a UE and identify, for the carrier, second resources for a second MIMO transmission to the UE.

Service identification component 1125 may identify a first service type associated with the first MIMO transmission, and identify a second service type associated with a second MIMO transmission, where the second service type is different from the first service type, and configure a second service type for the carrier that is multiplexed with the first MIMO transmission when data associated with the second service type is to be transmitted. In some cases, the set of service types includes a high-reliability and low-latency service type, a mobile broadband service type, a MTC service type, or combinations thereof. In some cases, the first service type is a mobile broadband service type and the second service type is a high-reliability and low-latency service type.

Codeword component 1130 may select a first number of codewords to be transmitted in the first MIMO transmission based on the first service type, and format information to be transmitted into one or more codewords corresponding to the selected first number of codewords. When an uplink MIMO transmission is transmitted, the codeword component 1130 may select a second number of codewords for the uplink MIMO transmission to be transmitted by the UE based on an uplink service type associated with the uplink MIMO transmission. In cases where a second service type is multiplexed with the first service type, the codeword component 1130 may select a second number of codewords for transmission of information to be transmitted in the second MIMO transmission based on the second service type associated with the second MIMO transmission, where the second number of codewords is different from the first number of codewords. In some cases, the first service type is an URLLC service type, and selecting the first number of codewords includes selecting one codeword for the first MIMO transmission. In some cases, the first service type is an eMBB service type, and selecting the first number of codewords includes selecting a set of codewords for the first MIMO transmission. In some cases, the second number of codewords is greater than the first number of codewords. In some cases, the selecting the first number of codewords is further based on a CoMP transmission technique, where two or more codewords are selected when the CoMP transmission technique is a non-coherent CoMP transmission, and one codeword is selected when the CoMP transmission technique is a coherent CoMP transmission.

Codeblock segmentation component 1135 may select a first CB size for one or more CBs to be transmitted in one or more codewords of the first MIMO transmission based on the first service type, and may format information to be transmitted into the one or more CBs. In some cases, the first CB size is selected to be a first number of bits when the first service type is a mobile broadband service type (e.g., eMBB, etc.), and the first CB size is selected to be a second number of bits when the first service type is a high-reliability and low-latency service type (e.g., URLLC, etc.), and where the second number of bits is smaller than the first number of bits. In some cases, the first CB size is selected to be smaller than a maximum CB size for the first service type when the second service type is configured.

Capability identification component 1140 may identify a processing capability of the UE, and where the selecting the first number of codewords is further based on the processing capability of the UE. Scheduling condition component 1145 may identify a scheduling condition associated with the UE, and where the selecting the first number of codewords is further based on the scheduling condition. In some cases, the scheduling condition includes one or more of an amount of data to be transmitted or a channel quality associated with the UE.

HARQ component 1150 may configure a number of HARQ processes at the UE based on the selected first number of codewords, configure a HARQ response timing based on the selected first number of codewords, and perform a retransmission for the one or more codeword using an indicated number of supported spatial layers. In some cases, the selected first number of codewords is one codeword that is to be transmitted across two or more spatial layers as part of the first MIMO transmission. In some cases, HARQ component 1150 may receive a feedback indication including a negative acknowledgement of the one codeword and an indication of a number of supported spatial layers for the UE.

MCS component 1155 may select a modulation order for each of a set of spatial layers associated with the first MIMO transmission based on a combined modulation and coding rate. In some cases, the selecting the first number of codewords includes selecting two or more codewords for the first MIMO transmission, and selecting an MCS for each codeword. In some cases, the selecting the first number of codewords includes selecting one codeword for the first MIMO transmission, and identifying a combined modulation and coding rate associated with the first MIMO transmission. Scrambling component 1160 may scramble a first number of codewords of a first service according to a first scrambling sequence associated with the first service type and scramble a second number of codewords of a second service according to a second scrambling sequence associated with the second service type.

Figure 12:
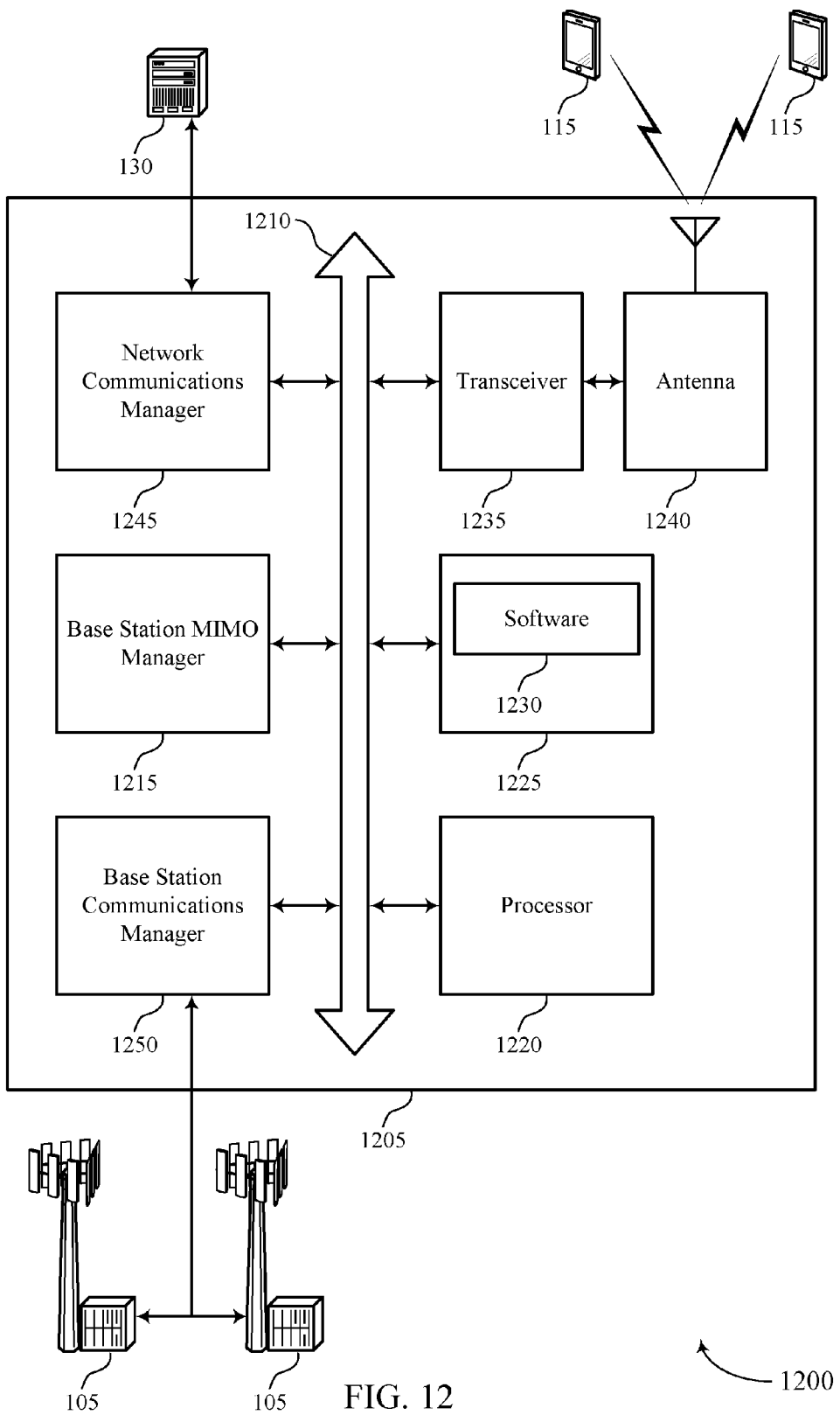
FIG. 12 illustrates a block diagram of a system including a base station that supports adaptive codeword and codeblock selection in wireless communications in accordance with aspects of the present disclosure.

FIG. 12 shows a diagram of a system 1200 including a device 1205 that supports adaptive codeword and codeblock selection in wireless communications in accordance with various aspects of the present disclosure. Device 1205 may be an example of or include the components of device 905, device 1005, or a base station 105 as described above, e.g., with reference to FIGS. 1 through 10. Device 1205 may include components for bi-directional voice and data communications including components for transmitting and receiving communications, including base station MIMO manager 1215, processor 1220, memory 1225, software 1230, transceiver 1235, antenna 1240, network communications manager 1245, and base station communications manager 1250. These components may be in electronic communication via one or more busses (e.g., bus 1210). Device 1205 may communicate wirelessly with one or more UEs 115.

Processor 1220 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting adaptive codeword and codeblock selection in wireless communications).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support adaptive codeword and codeblock selection in wireless communications. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network 130 (e.g., via one or more wired backhaul links). For example, the network communications manager 1245 may manage the transfer of data communications for client devices, such as one or more UEs 115.

Base station communications manager 1250 may manage communications with other base station 105, and may include a controller or scheduler for controlling communications with UEs 115 in cooperation with other base stations 105. For example, the base station communications manager 1250 may coordinate scheduling for transmissions to UEs 115 for various interference mitigation techniques such as beamforming or joint transmission. In some examples, base station communications manager 1250 may provide an X2 interface within an LTE/LTE-A wireless communication network technology to provide communication between base stations 105.

Figure 13:
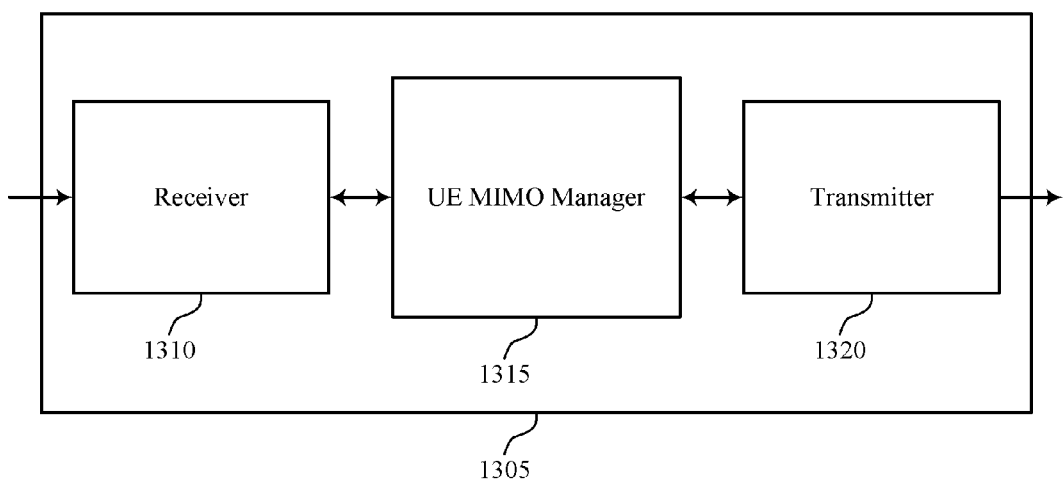
FIGS. 13 through 15 show block diagrams of a device that supports adaptive codeword and codeblock selection in wireless communications in accordance with aspects of the present disclosure.

FIG. 13 shows a block diagram 1300 of a device 1305 that supports adaptive codeword and codeblock selection in wireless communications in accordance with various aspects of the present disclosure. Device 1305 may be an example of aspects of a UE 115 as described with reference to FIGS. 1 through 12. Device 1305 may include receiver 1310, UE MIMO manager 1315, and transmitter 1320. Device 1305 may also include a processor. Each of these components may be in communication with one another (e.g., via one or more buses).

Receiver 1310 may receive information such as packets, user data, or control information associated with various information channels (e.g., control channels, data channels, and information related to adaptive codeword and codeblock selection in wireless communications, etc.). Information may be passed on to other components of the device. The receiver 1310 may be an example of aspects of the transceiver 1635 described with reference to FIG. 16.

Receiver 1310 may receive a first downlink MIMO transmission associated with the first service type from a base station and in some cases may receive a second downlink MIMO transmission from the base station associated with a second service type, where the second service type is different from the first service type.

UE MIMO manager 1315 may be an example of aspects of the UE MIMO manager 102, the UE MIMO manager 202, or the UE MIMO manager 1615 described with reference to FIG. 1, 2, or 16.

UE MIMO manager 1315 may receive, for a carrier supporting a set of service types, a resource allocation of uplink resources for transmission of a first uplink MIMO transmission to a base station, the first uplink MIMO transmission having an associated first service type, select a first number of codewords to be transmitted in the first uplink MIMO transmission based on the first service type, and format information to be transmitted into one or more codewords corresponding to the selected first number of codewords. The UE MIMO manager 1315 may also receive, over a carrier supporting a set of service types, a resource allocation of uplink resources for transmission of a first uplink MIMO transmission to a base station, the first uplink MIMO transmission having an associated first service type, identify a first CB size for one or more CBs to be transmitted in one or more codewords of the first uplink MIMO transmission based on the first service type, and format information to be transmitted into the one or more CBs.

Transmitter 1320 may transmit signals generated by other components of the device. In some examples, the transmitter 1320 may be collocated with a receiver 1310 in a transceiver. For example, the transmitter 1320 may be an example of aspects of the transceiver 1635 described with reference to FIG. 16. The transmitter 1320 may include a single antenna, or it may include a set of antennas.

Transmitter 1320 may transmit the one or more codewords in the first uplink MIMO transmission to the base station and transmit the one or more CBs in the first uplink MIMO transmission to the base station.

Figure 14:
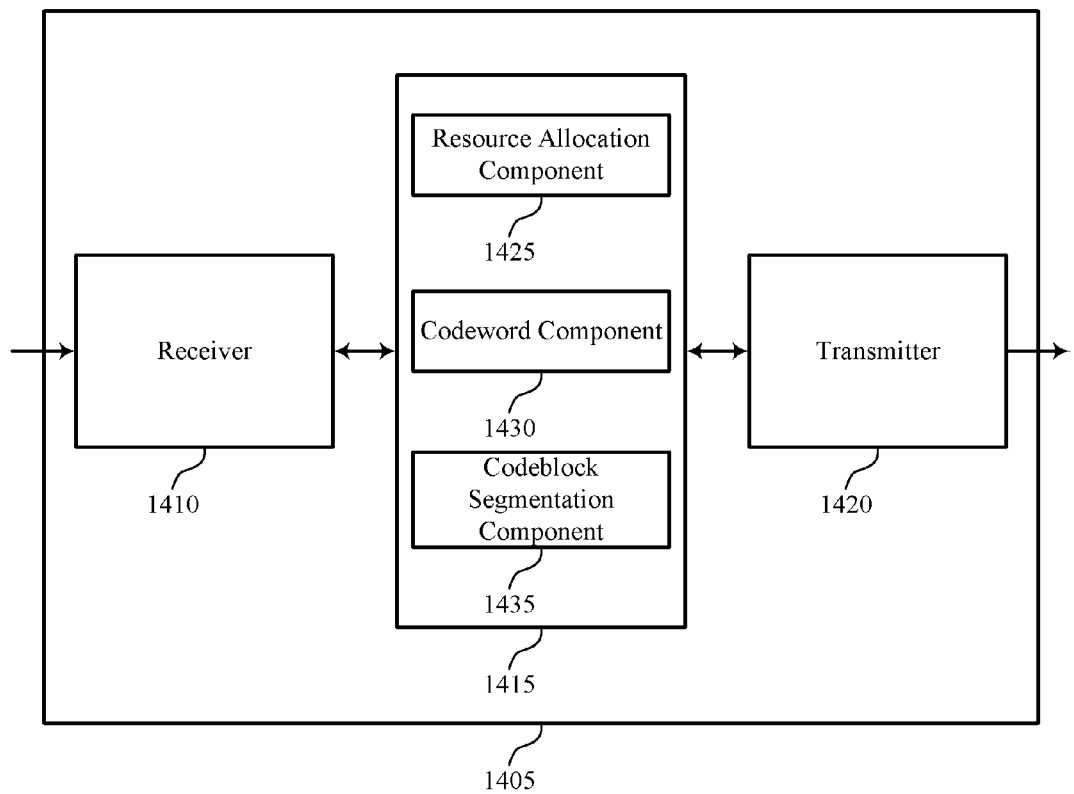

FIG. 14 shows a block diagram 1400 of a device 1405 that supports adaptive codeword and codeblock selection in wireless communications in accordance with various aspects of the present disclosure. Device 1405 may be an example of aspects of a device 1305 or a UE 115 as described with reference to FIGS. 1 and 13. Device 1405 may include receiver 1410, UE MIMO manager 1415, and transmitter 1420. Device 1405 may also include a processor. Each of these components may be in communication with one another (e.g., via one or more buses).

Receiver 1410 may receive information such as packets, user data, or control information associated with various information channels (e.g., control channels, data channels, and information related to adaptive codeword and codeblock selection in wireless communications, etc.). Information may be passed on to other components of the device. The receiver 1410 may be an example of aspects of the transceiver 1635 described with reference to FIG. 16. UE MIMO manager 1415 may be an example of aspects of the UE MIMO manager 102, the UE MIMO manager 202, or the UE MIMO manager 1615 described with reference to FIG. 1, 2, or 16. UE MIMO manager 1415 may also include resource allocation component 1425, codeword component 1430, and codeblock segmentation component 1435.

Resource allocation component 1425 may receive, for a carrier supporting a set of service types, a resource allocation of uplink resources for transmission of a first uplink MIMO transmission to a base station, the first uplink MIMO transmission having an associated first service type and receive, over a carrier supporting a set of service types, a resource allocation of uplink resources for transmission of a first uplink MIMO transmission to a base station, the first uplink MIMO transmission having an associated first service type.

Codeword component 1430 may select a first number of codewords to be transmitted in the first uplink MIMO transmission based on the first service type, and format information to be transmitted into one or more codewords corresponding to the selected first number of codewords. Codeword component 1430 also may identify a first number of downlink codewords associated with the first downlink MIMO transmission based on the first service type, and identify a second number of downlink codewords associated with the second downlink MIMO transmission based on the second service type, where the second number of downlink codewords is different from the first number of downlink codewords. In some cases, the first service type is an URLLC service type, and selecting the first number of codewords includes selecting one codeword for the first uplink MIMO transmission. In some cases, the first service type is an eMBB service type, and selecting the first number of codewords includes selecting a set of codewords for the first uplink MIMO transmission.

Codeblock segmentation component 1435 may identify a first CB size for one or more CBs to be transmitted in one or more codewords of the first uplink MIMO transmission based on the first service type and format information to be transmitted into the one or more CBs. In some cases, the first CB size is a first number of bits when the first service type is a mobile broadband service type, and the first CB size is a second number of bits when the first service type is a high-reliability and low-latency service type, and where the second number of bits is smaller than the first number of bits. In some cases, the first CB size is smaller than a maximum CB size for the first service type when the second service type is configured.

Transmitter 1420 may transmit signals generated by other components of the device. In some examples, the transmitter 1420 may be collocated with a receiver 1410 in a transceiver. For example, the transmitter 1420 may be an example of aspects of the transceiver 1635 described with reference to FIG. 16. The transmitter 1420 may include a single antenna, or it may include a set of antennas.

Figure 15:
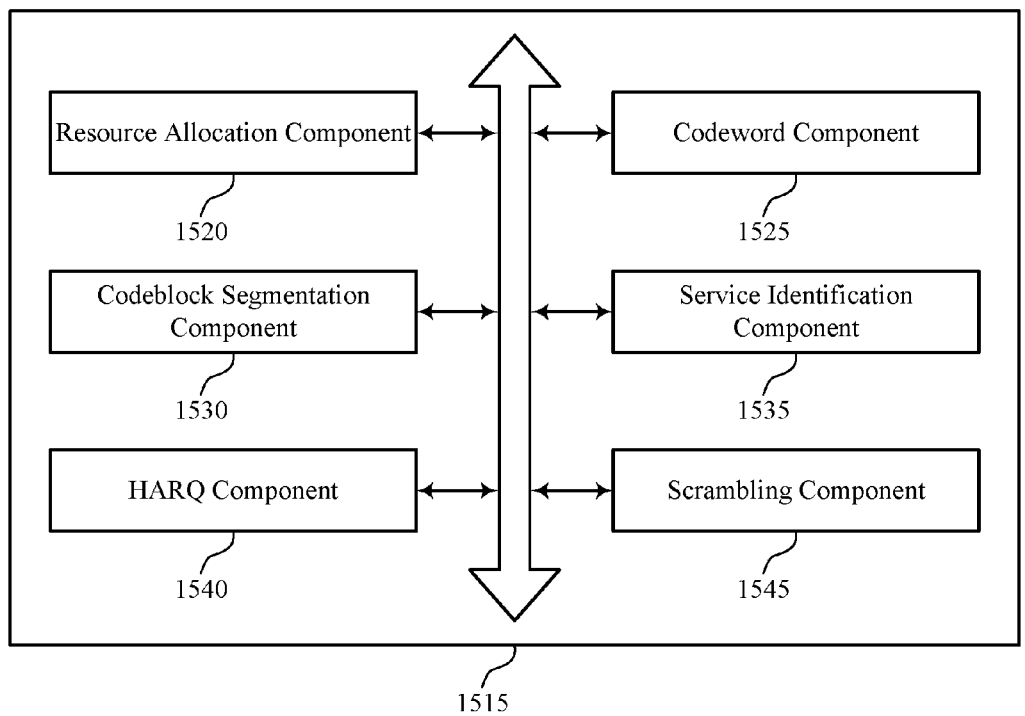

FIG. 15 shows a block diagram 1500 of a UE MIMO manager 1515 that supports adaptive codeword and codeblock selection in wireless communications in accordance with various aspects of the present disclosure. The UE MIMO manager 1515 may be an example of aspects of the UE MIMO manager 102, the UE MIMO manager 202, UE MIMO manager 1315, the UE MIMO manager 1415, or a UE MIMO manager 1615 described with reference to FIGS. 1, 2, 13, 14, and 16. The UE MIMO manager 1515 may include resource allocation component 1520, codeword component 1525, codeblock segmentation component 1530, service identification component 1535, HARQ component 1540, and scrambling component 1545. Each of these components may communicate, directly or indirectly, with one another (e.g., via one or more buses).

Resource allocation component 1520 may receive, for a carrier supporting a set of service types, a resource allocation of uplink resources for transmission of a first uplink MIMO transmission to a base station, the first uplink MIMO transmission having an associated first service type.

Codeword component 1525 may select a first number of codewords to be transmitted in the first uplink MIMO transmission based on the first service type, and format information to be transmitted into one or more codewords corresponding to the selected first number of codewords. Codeword component 1525, also may identify a first number of downlink codewords associated with the first downlink MIMO transmission based on the first service type, and identify a second number of downlink codewords associated with the second downlink MIMO transmission based on the second service type, where the second number of downlink codewords is different from the first number of downlink codewords. In some cases, the first service type is an URLLC service type, and where the selecting the first number of codewords includes selecting one codeword for the first uplink MIMO transmission. In some cases, the first service type is an eMBB service type, and where the selecting the first number of codewords includes selecting a set of codewords for the first uplink MIMO transmission.

Codeblock segmentation component 1530 may identify a first CB size for one or more CBs to be transmitted in one or more codewords of the first uplink MIMO transmission based on the first service type and format information to be transmitted into the one or more CBs. In some cases, the first CB size is a first number of bits when the first service type is a mobile broadband service type, and the first CB size is a second number of bits when the first service type is a high-reliability and low-latency service type, and where the second number of bits is smaller than the first number of bits. In some cases, the first CB size is smaller than a maximum CB size for the first service type when the second service type is configured.

Service identification component 1535 may configure a second service type that is multiplexed with the first uplink MIMO transmission when data associated with the second service type is to be transmitted, and where the first CB size is further based on a second CB size associated with the second service type. In some cases, the set of service types includes a high-reliability and low-latency service type, a mobile broadband service type, a MTC service type, or combinations thereof. In some cases, the first service type is a mobile broadband service type and the second service type is a high-reliability and low-latency service type.

HARQ component 1540 may identify a number of HARQ processes for the first MIMO transmission based on the selected first number of codewords, identify a HARQ response timing for the first uplink MIMO transmission based on the selected first number of codewords, and transmit a feedback indication and indication of the number of supported spatial layers to the base station. In some cases, the identified first number of downlink codewords is one codeword that is transmitted across two or more spatial layers as part of the first downlink MIMO transmission, and a feedback indication in generated including a negative acknowledgement of the one codeword and an indication of a number of supported spatial layers.

Scrambling component 1545 may descramble the first downlink MIMO transmission using a first scrambling sequence associated with the first service type and descramble the second downlink MIMO transmission using a second scrambling sequence associated with the second service type, where the second scrambling sequence is different from the first scrambling sequence.

Figure 16:
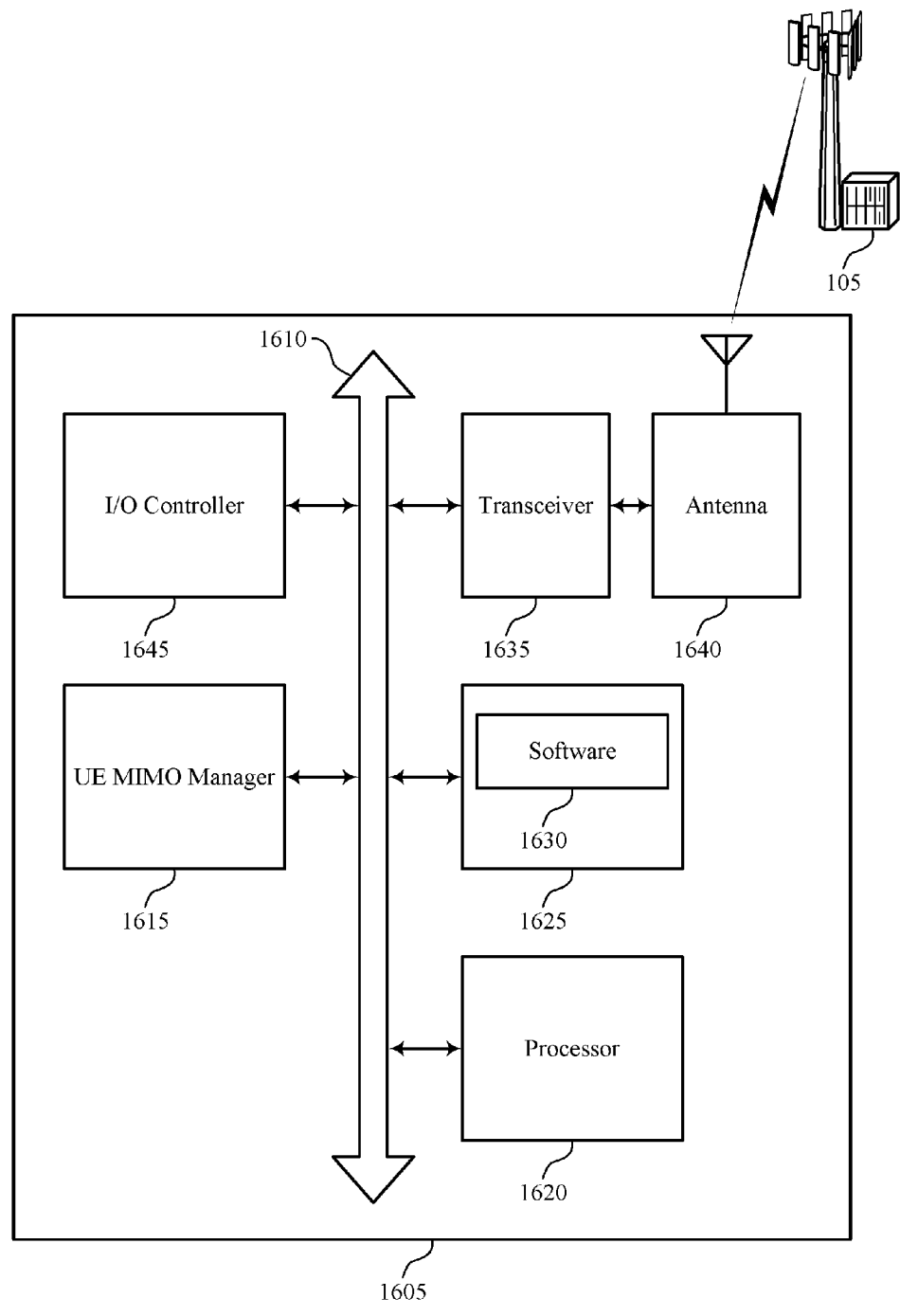
FIG. 16 illustrates a block diagram of a system including a UE that supports adaptive codeword and codeblock selection in wireless communications in accordance with aspects of the present disclosure.

FIG. 16 shows a diagram of a system 1600 including a device 1605 that supports adaptive codeword and codeblock selection in wireless communications in accordance with various aspects of the present disclosure. Device 1605 may be an example of or include the components of UE 115 as described above, e.g., with reference to FIG. 1. Device 1605 may include components for bi-directional voice and data communications including components for transmitting and receiving communications, including UE MIMO manager 1615, processor 1620, memory 1625, software 1630, transceiver 1635, antenna 1640, and I/O controller 1645. These components may be in electronic communication via one or more buses (e.g., bus 1610). Device 1605 may communicate wirelessly with one or more base stations 105.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting adaptive codeword and codeblock selection in wireless communications).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware and/or software operation such as the interaction with peripheral components or devices.

Software 1630 may include code to implement aspects of the present disclosure, including code to support adaptive codeword and codeblock selection in wireless communications. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system.

Figure 17:
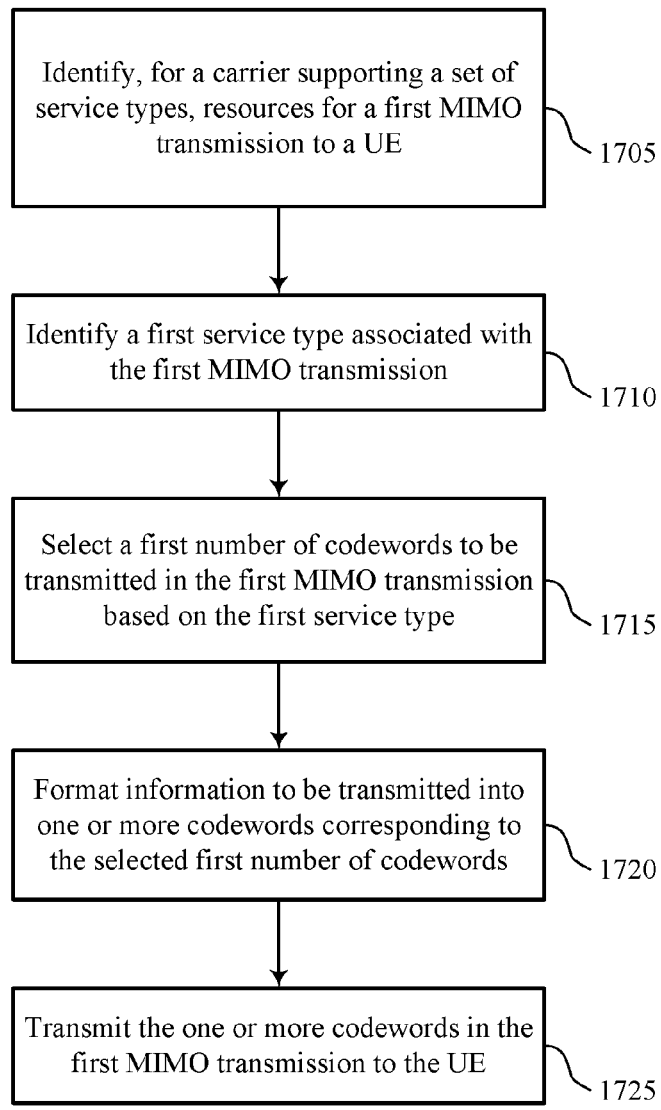
FIGS. 17 through 21 illustrate methods for adaptive codeword and codeblock selection in wireless communications in accordance with aspects of the present disclosure.

FIG. 17 shows a flowchart illustrating a method 1700 for adaptive codeword and codeblock selection in wireless communications in accordance with various aspects of the present disclosure. The operations of method 1700 may be implemented by a base station 105 or its components as described herein. For example, the operations of method 1700 may be performed by a base station MIMO manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may identify, for a carrier supporting a plurality of service types, resources for a first MIMO transmission to a UE 115. The operations of block 1705 may be performed according to the methods described with reference to FIGS. 1 through 8. In certain examples, aspects of the operations of block 1705 may be performed by a resource allocation component as described with reference to FIGS. 9 through 12.

At block 1710 the base station 105 may identify a first service type associated with the first MIMO transmission. The operations of block 1710 may be performed according to the methods described with reference to FIGS. 1 through 8. In certain examples, aspects of the operations of block 1710 may be performed by a service identification component as described with reference to FIGS. 9 through 12.

At block 1715 the base station 105 may select a first number of codewords to be transmitted in the first MIMO transmission based at least in part on the first service type. The operations of block 1715 may be performed according to the methods described with reference to FIGS. 1 through 8. In certain examples, aspects of the operations of block 1715 may be performed by a codeword component as described with reference to FIGS. 9 through 12.

At block 1720 the base station 105 may format information to be transmitted into one or more codewords corresponding to the selected first number of codewords. The operations of block 1720 may be performed according to the methods described with reference to FIGS. 1 through 8. In certain examples, aspects of the operations of block 1720 may be performed by a codeword component as described with reference to FIGS. 9 through 12.

At block 1725 the base station 105 may transmit the one or more codewords in the first MIMO transmission to the UE. The operations of block 1725 may be performed according to the methods described with reference to FIGS. 1 through 8. In certain examples, aspects of the operations of block 1725 may be performed by a transmitter as described with reference to FIGS. 9 through 12.

Figure 18:
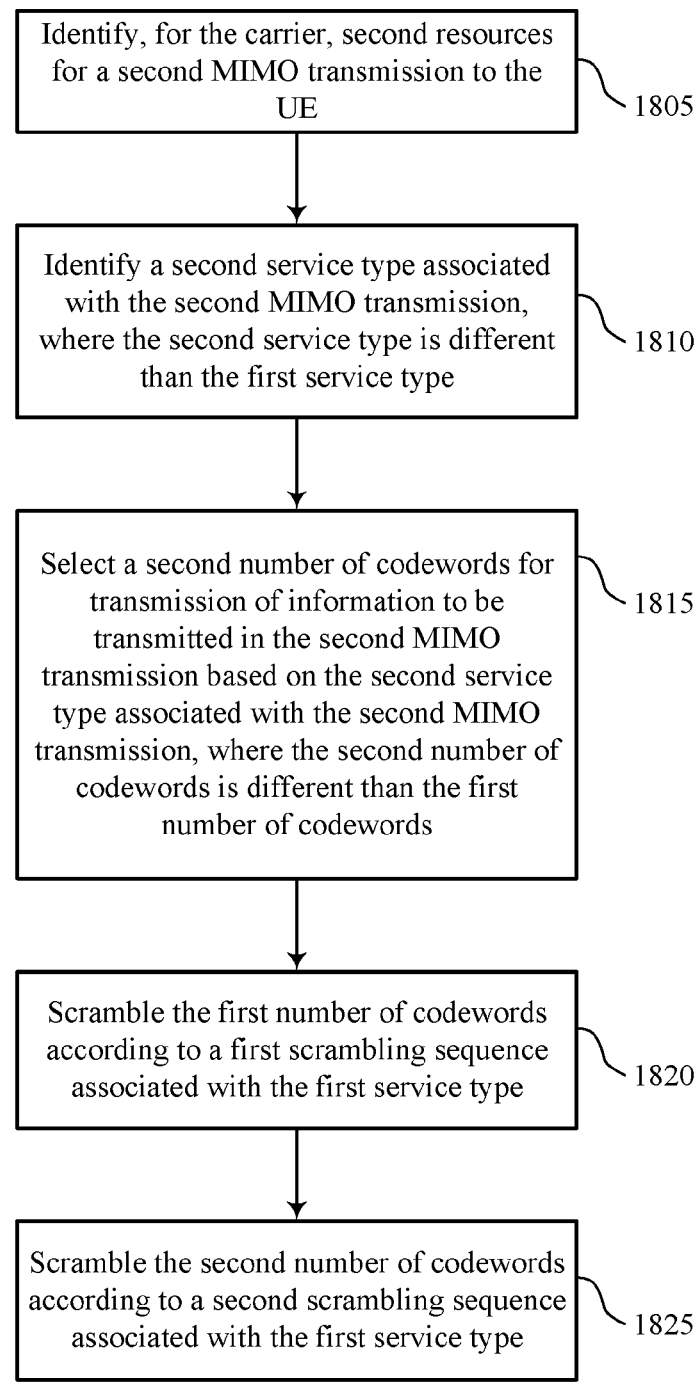

FIG. 18 shows a flowchart illustrating a method 1800 for adaptive codeword and codeblock selection in wireless communications in accordance with various aspects of the present disclosure. The operations of method 1800 may be implemented by a base station 105 or its components as described herein. For example, the operations of method 1800 may be performed by a base station MIMO manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may identify, for the carrier, second resources for a second MIMO transmission to the UE. The operations of block 1805 may be performed according to the methods described with reference to FIGS. 1 through 8. In certain examples, aspects of the operations of block 1805 may be performed by a resource allocation component as described with reference to FIGS. 9 through 12.

At block 1810 the base station 105 may identify a second service type associated with the second MIMO transmission, wherein the second service type is different from the first service type. The operations of block 1810 may be performed according to the methods described with reference to FIGS. 1 through 8. In certain examples, aspects of the operations of block 1810 may be performed by a service identification component as described with reference to FIGS. 9 through 12.

At block 1815 the base station 105 may select a second number of codewords for transmission of information to be transmitted in the second MIMO transmission based at least in part on the second service type associated with the second MIMO transmission, wherein the second number of codewords is different from the first number of codewords. The operations of block 1815 may be performed according to the methods described with reference to FIGS. 1 through 8. In certain examples, aspects of the operations of block 1815 may be performed by a codeword component as described with reference to FIGS. 9 through 12.

At block 1820 the base station 105 may scramble the first number of codewords according to a first scrambling sequence associated with the first service type. The operations of block 1820 may be performed according to the methods described with reference to FIGS. 1 through 8. In certain examples, aspects of the operations of block 1820 may be performed by a scrambling component as described with reference to FIGS. 9 through 12.

At block 1825 the base station 105 may scramble the second number of codewords according to a second scrambling sequence associated with the first service type. The operations of block 1825 may be performed according to the methods described with reference to FIGS. 1 through 8. In certain examples, aspects of the operations of block 1825 may be performed by a scrambling component as described with reference to FIGS. 9 through 12.

Figure 19:
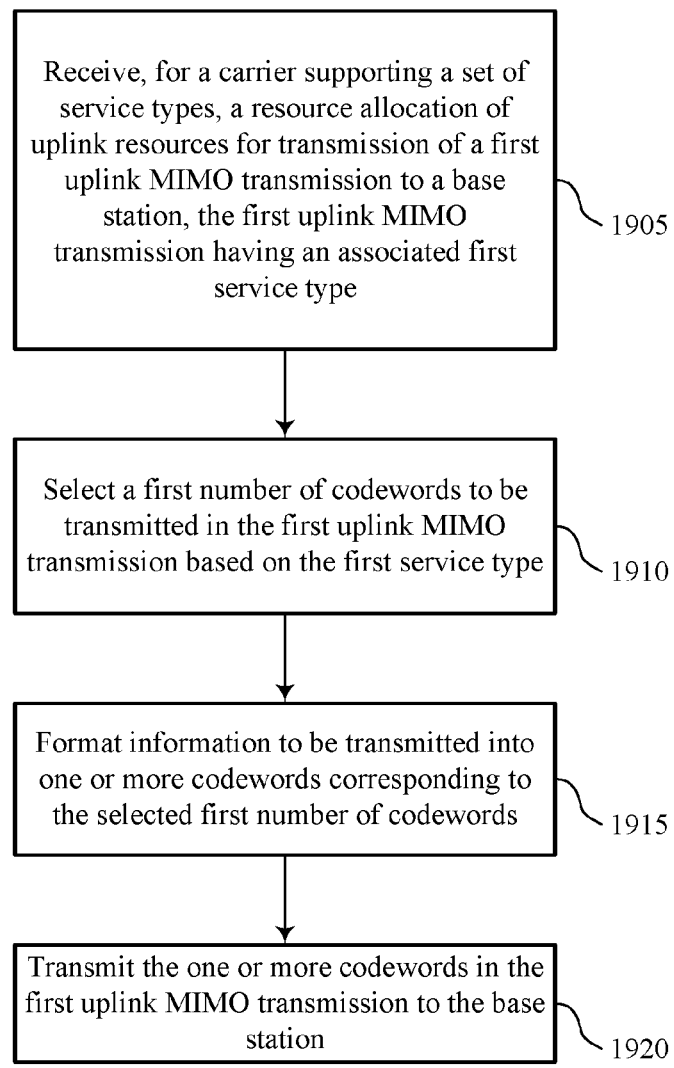

FIG. 19 shows a flowchart illustrating a method 1900 for adaptive codeword and codeblock selection in wireless communications in accordance with various aspects of the present disclosure. The operations of method 1900 may be implemented by a UE 115 or its components as described herein. For example, the operations of method 1900 may be performed by a UE MIMO manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive, for a carrier supporting a plurality of service types, a resource allocation of uplink resources for transmission of a first uplink MIMO transmission to a base station, the first uplink MIMO transmission having an associated first service type. The operations of block 1905 may be performed according to the methods described with reference to FIGS. 1 through 8. In certain examples, aspects of the operations of block 1905 may be performed by a resource allocation component as described with reference to FIGS. 13 through 16.

At block 1910 the UE 115 may select a first number of codewords to be transmitted in the first uplink MIMO transmission based at least in part on the first service type. The operations of block 1910 may be performed according to the methods described with reference to FIGS. 1 through 8. In certain examples, aspects of the operations of block 1910 may be performed by a codeword component as described with reference to FIGS. 13 through 16.

At block 1915 the UE 115 may format information to be transmitted into one or more codewords corresponding to the selected first number of codewords. The operations of block 1915 may be performed according to the methods described with reference to FIGS. 1 through 8. In certain examples, aspects of the operations of block 1915 may be performed by a codeword component as described with reference to FIGS. 13 through 16.

At block 1920 the UE 115 may transmit the one or more codewords in the first uplink MIMO transmission to the base station. The operations of block 1920 may be performed according to the methods described with reference to FIGS. 1 through 8. In certain examples, aspects of the operations of block 1920 may be performed by a transmitter as described with reference to FIGS. 13 through 16.

Figure 20:
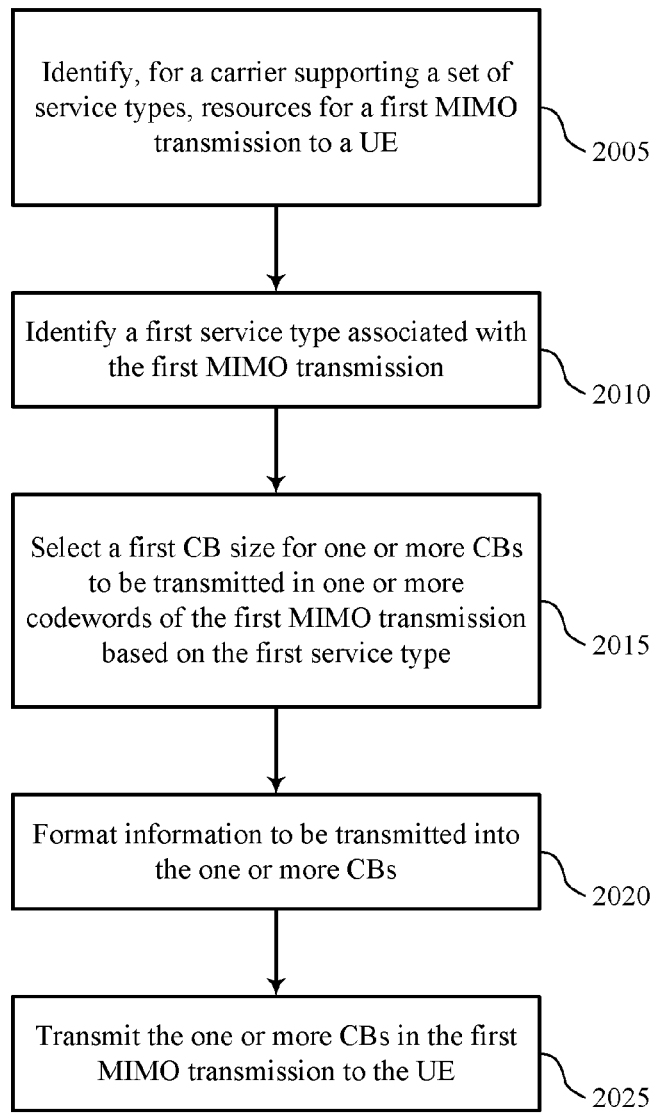

FIG. 20 shows a flowchart illustrating a method 2000 for adaptive codeword and codeblock selection in wireless communications in accordance with various aspects of the present disclosure. The operations of method 2000 may be implemented by a base station 105 or its components as described herein. For example, the operations of method 2000 may be performed by a base station MIMO manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may identify, for a carrier supporting a plurality of service types, resources for a first MIMO transmission to a UE. The operations of block 2005 may be performed according to the methods described with reference to FIGS. 1 through 8. In certain examples, aspects of the operations of block 2005 may be performed by a resource allocation component as described with reference to FIGS. 9 through 12.

At block 2010 the base station 105 may identify a first service type associated with the first MIMO transmission. The operations of block 2010 may be performed according to the methods described with reference to FIGS. 1 through 8. In certain examples, aspects of the operations of block 2010 may be performed by a service identification component as described with reference to FIGS. 9 through 12.

At block 2015 the base station 105 may select a first CB size for one or more CBs to be transmitted in one or more codewords of the first MIMO transmission based at least in part on the first service type. The operations of block 2015 may be performed according to the methods described with reference to FIGS. 1 through 8. In certain examples, aspects of the operations of block 2015 may be performed by a codeblock segmentation component as described with reference to FIGS. 9 through 12.

At block 2020 the base station 105 may format information to be transmitted into the one or more CBs. The operations of block 2020 may be performed according to the methods described with reference to FIGS. 1 through 8. In certain examples, aspects of the operations of block 2020 may be performed by a codeblock segmentation component as described with reference to FIGS. 9 through 12.

At block 2025 the base station 105 may transmit the one or more CBs in the first MIMO transmission to the UE. The operations of block 2025 may be performed according to the methods described with reference to FIGS. 1 through 8. In certain examples, aspects of the operations of block 2025 may be performed by a transmitter as described with reference to FIGS. 9 through 12.

Figure 21:
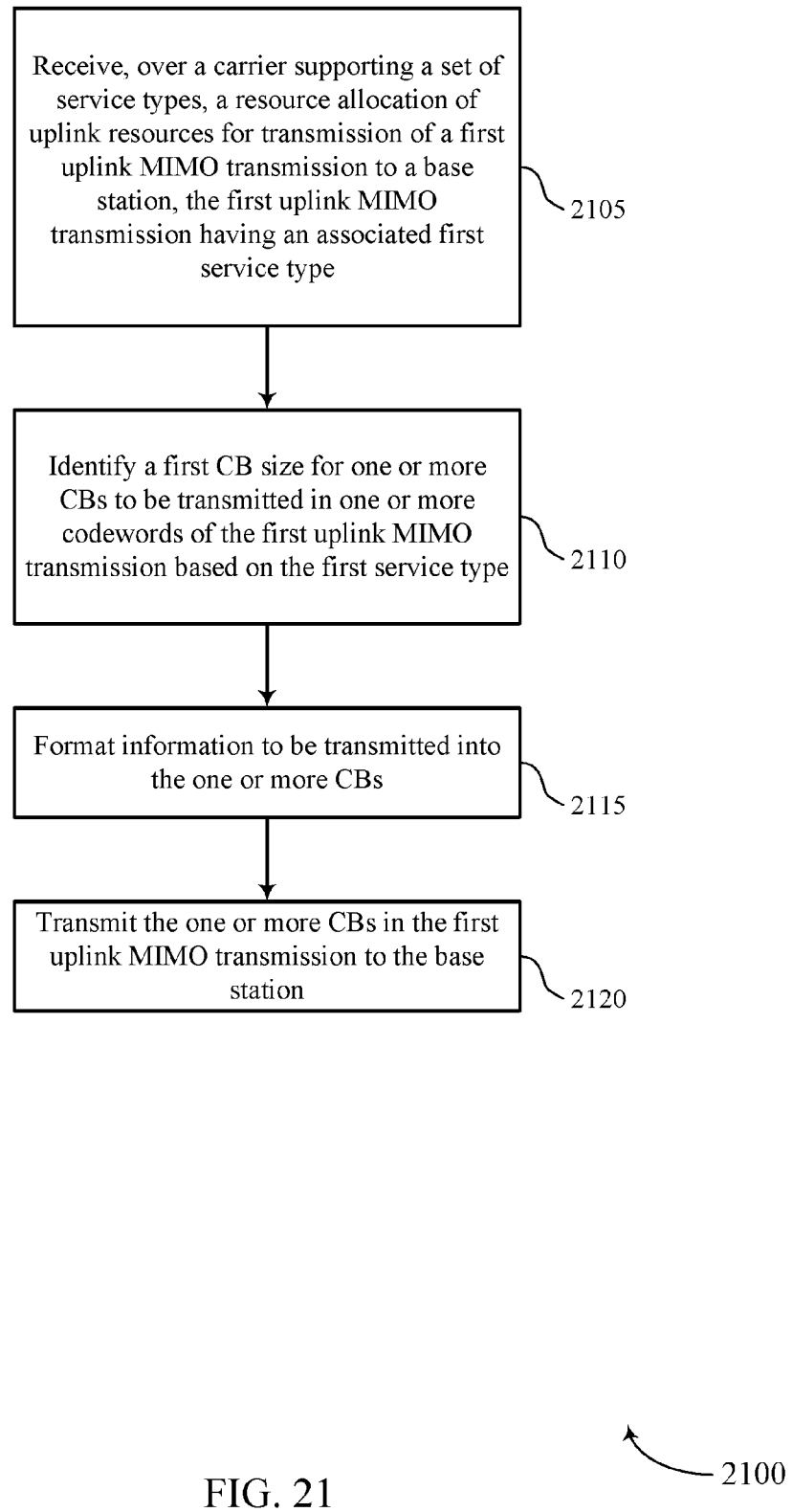

FIG. 21 shows a flowchart illustrating a method 2100 for adaptive codeword and codeblock selection in wireless communications in accordance with various aspects of the present disclosure. The operations of method 2100 may be implemented by a UE 115 or its components as described herein. For example, the operations of method 2100 may be performed by a UE MIMO manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may receive, over a carrier supporting a plurality of service types, a resource allocation of uplink resources for transmission of a first uplink MIMO transmission to a base station, the first uplink MIMO transmission having an associated first service type. The operations of block 2105 may be performed according to the methods described with reference to FIGS. 1 through 8. In certain examples, aspects of the operations of block 2105 may be performed by a resource allocation component as described with reference to FIGS. 13 through 16.

At block 2110 the UE 115 may identify a first CB size for one or more CBs to be transmitted in one or more codewords of the first uplink MIMO transmission based at least in part on the first service type. The operations of block 2110 may be performed according to the methods described with reference to FIGS. 1 through 8. In certain examples, aspects of the operations of block 2110 may be performed by a codeblock segmentation component as described with reference to FIGS. 13 through 16.

At block 2115 the UE 115 may format information to be transmitted into the one or more CBs. The operations of block 2115 may be performed according to the methods described with reference to FIGS. 1 through 8. In certain examples, aspects of the operations of block 2115 may be performed by a codeblock segmentation component as described with reference to FIGS. 13 through 16.

At block 2120 the UE 115 may transmit the one or more CBs in the first uplink MIMO transmission to the base station. The operations of block 2120 may be performed according to the methods described with reference to FIGS. 1 through 8. In certain examples, aspects of the operations of block 2120 may be performed by a transmitter as described with reference to FIGS. 13 through 16.

It should be noted that the methods described above describe possible implementations, and that the operations and the steps may be rearranged or otherwise modified and that other implementations are possible. Furthermore, aspects from two or more of the methods 1700, 1800, 1900, 2000, or 2100 described with reference to FIG. 17, 18, 19, 20, or 21 may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of Universal Mobile Telecommunications System (UMTS) that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying, for a carrier supporting a plurality of service types, resources for a first multiple-input multiple-output (MIMO) transmission;
   identifying a first service type associated with the first MIMO transmission;
   selecting a first number of codewords to be transmitted in the first MIMO transmission based at least in part on the first service type;
   formatting information to be transmitted into one or more codewords corresponding to the selected first number of codewords; and
   transmitting the one or more codewords in the first MIMO transmission.

2. The method of claim 1, further comprising:
   identifying a processing capability of a user equipment (UE), the UE being a receiver for the MIMO transmission,
   wherein the selecting the first number of codewords is further based at least in part on the processing capability of the UE.

3. The method of claim 1, further comprising:
   identifying a scheduling condition comprising one or more of an amount of data to be transmitted or a channel quality associated with a user equipment (UE), the UE being a receiver for the MIMO transmission,
   wherein the selecting the first number of codewords is further based at least in part on the scheduling condition.

4. The method of claim 1, further comprising:
   identifying a number of hybrid automatic repeat request (HARQ) processes based at least in part on the selected first number of codewords.

5. The method of claim 4, further comprising:
   identifying a HARQ response timing based at least in part on the selected first number of codewords.

6. The method of claim 1, further comprising:
   determining that the first MIMO transmission is to be transmitted from multiple transmitters to a user equipment (UE) according to a coordinated multi-point (CoMP) transmission technique, and
   wherein the selecting the first number of codewords is further based at least in part on the CoMP transmission technique.

7. The method of claim 6, wherein two or more codewords are selected for the first MIMO transmission when the CoMP transmission technique is a non-coherent CoMP transmission, and one codeword is selected for the first MIMO transmission when the CoMP transmission technique is a coherent CoMP transmission.

8. The method of claim 1, wherein the selecting the first number of codewords is based at least in part on whether the first MIMO transmission is an uplink transmission or a downlink transmission.

9. The method of claim 1, wherein the selecting the first number of codewords comprises selecting two or more codewords for the first MIMO transmission, and wherein the method further comprises:
   selecting a modulation and coding scheme (MCS) for each codeword.

10. The method of claim 1, wherein the selecting the first number of codewords comprises selecting one codeword for the first MIMO transmission, and wherein the method further comprises:
    identifying a combined modulation and coding rate associated with the first MIMO transmission; and
    selecting a modulation order for each of a plurality of spatial layers associated with the first MIMO transmission based at least in part on the combined modulation and coding rate.

11. The method of claim 10, further comprising:
    receiving a feedback indication from a user equipment (UE) comprising a negative acknowledgement of the one codeword and an indication of a number of supported spatial layers for the UE; and performing a retransmission for the one codeword using the indicated number of supported spatial layers.

12. The method of claim 1, further comprising:
identifying, for the carrier, second resources for a second MIMO transmission;
identifying a second service type associated with the second MIMO transmission, wherein the second service type is different than the first service type; and
selecting a second number of codewords to be transmitted in the second MIMO transmission based at least in part on the second service type associated with the second MIMO transmission, wherein the second number of codewords is different than the first number of codewords.

13. The method of claim 12, further comprising:
scrambling the first MIMO transmission according to a first scrambling sequence associated with the first service type; and
scrambling the second MIMO transmission according to a second scrambling sequence associated with the first service type.

14. The method of claim 1, further comprising:
receiving a second MIMO transmission associated with the first service type; and
identifying a second number of codewords associated with the second MIMO transmission based at least in part on the first service type.

15. The method of claim 14, further comprising
receiving a third MIMO transmission associated with a second service type, wherein the second service type is different than the first service type; and
identifying a third number of codewords associated with the third MIMO transmission based at least in part on the second service type, wherein the second number of codewords is different than the third number of codewords.

16. The method of claim 15, further comprising:
descrambling the second MIMO transmission using a first scrambling sequence associated with the first service type; and
descrambling the third MIMO transmission using a second scrambling sequence associated with the second service type, wherein the second scrambling sequence is different than the first scrambling sequence.

17. The method of claim 1, wherein
the plurality of service types comprises a high-reliability and low-latency service type, a mobile broadband service type, a machine-type-communication (MTC) service type, or combinations thereof.

18. The method of claim 17, wherein
the first service type is an ultra-reliable low latency communication (URLLC) service type, and wherein selecting the first number of codewords comprises:
selecting one codeword for the first MIMO transmission.

19. The method of claim 17, wherein
the first service type is an enhanced mobile broadband (eMBB) service type, and wherein selecting the first number of codewords comprises:
selecting one or more codewords for the first MIMO transmission.

20. A method for wireless communication, comprising:
identifying, for a carrier supporting a plurality of service types, resources for a first multiple-input multiple-output (MIMO) transmission;
identifying a first service type associated with the first MIMO transmission;
selecting a first codeblock (CB) size for one or more CBs to be transmitted in one or more codewords of the first MIMO transmission based at least in part on the first service type;
formatting information to be transmitted into the one or more CBs; and
transmitting the one or more CBs in the first MIMO transmission.

21. The method of claim 20, wherein the first CB size is selected to be a first number of bits when the first service type is a mobile broadband service type, and the first CB size is selected to be a second number of bits when the first service type is a high-reliability and low-latency service type, and wherein the second number of bits is smaller than the first number of bits.

22. The method of claim 20, further comprising:
configuring a second service type for the carrier that is multiplexed with the first MIMO transmission when data associated with the second service type is to be transmitted, and wherein
the selecting the first CB size is further based on a second CB size associated with the second service type.

23. The method of claim 22, wherein the first service type is a mobile broadband service type and the second service type is a high-reliability and low-latency service type.

24. The method of claim 22, wherein the first CB size is selected to be smaller than a maximum CB size for the first service type when the second service type is configured.

25. An apparatus for wireless communication, in a system comprising:
a processor;
memory in electronic communication with the processor; and
instructions stored in the memory and operable, when executed by the processor, to cause the apparatus to:
identify, for a carrier supporting a plurality of service types, resources for a first multiple-input multiple-output (MIMO) transmission;
identify a first service type associated with the first MIMO transmission;
select a first number of codewords to be transmitted in the first MIMO transmission based at least in part on the first service type;
format information to be transmitted into one or more codewords corresponding to the selected first number of codewords; and
transmit the one or more codewords in the first MIMO transmission.

26. The apparatus of claim 25, wherein the instructions are further executable by the processor to cause the apparatus to:
identify, for the carrier, second resources for a second MIMO transmission;
identify a second service type associated with the second MIMO transmission, wherein the second service type is different than the first service type; and
select a second number of codewords to be transmitted in the second MIMO transmission based at least in part on the second service type associated with the second MIMO transmission, wherein the second number of codewords is different than the first number of codewords.

27. The apparatus of claim 26, wherein the instructions are further executable by the processor to cause the apparatus to:

scramble the first MIMO transmission according to a first scrambling sequence associated with the first service type; and scramble the second MIMO transmission according to a second scrambling sequence associated with the first service type.

28. The apparatus of claim 25, wherein the instructions are further executable by the processor to cause the apparatus to:

receive a second MIMO transmission associated with the first service type;

identify a second number of codewords associated with the second MIMO transmission based at least in part on the first service type;

receive a third MIMO transmission associated with a second service type, wherein the second service type is different than the first service type; and identify a third number of codewords associated with the third MIMO transmission based at least in part on the second service type, wherein the second number of codewords is different than the third number of codewords.

29. An apparatus for wireless communication, in a system comprising:

a processor;

memory in electronic communication with the processor; and instructions stored in the memory and operable, when executed by the processor, to cause the apparatus to:

identify, for a carrier supporting a plurality of service types, resources for a first multiple-input multiple-output (MIMO) transmission;

identify a first service type associated with the first MIMO transmission;

select a first codeblock (CB) size for one or more CBs to be transmitted in one or more codewords of the first MIMO transmission based at least in part on the first service type;

format information to be transmitted into the one or more CBs; and transmit the one or more CBs in the first MIMO transmission.

30. The apparatus of claim 29, wherein the instructions are further executable by the processor to cause the apparatus to:

configure a second service type for the carrier that is multiplexed with the first MIMO transmission when data associated with the second service type is to be transmitted, and wherein the select the first CB size is further based on a second CB size associated with the second service type.

* * * * *